United States Patent
Wakabayashi et al.

(10) Patent No.: US 9,438,877 B2
(45) Date of Patent: Sep. 6, 2016

(54) DISPARITY CALCULATING DEVICE AND DISTANCE CALCULATING DEVICE

(75) Inventors: Yasutaka Wakabayashi, Osaka (JP); Kei Tokui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 292 days.

(21) Appl. No.: 14/006,515

(22) PCT Filed: Mar. 22, 2012

(86) PCT No.: PCT/JP2012/057320
§ 371 (c)(1),
(2), (4) Date: Sep. 20, 2013

(87) PCT Pub. No.: WO2012/128314
PCT Pub. Date: Sep. 27, 2012

(65) Prior Publication Data
US 2014/0009577 A1 Jan. 9, 2014

(30) Foreign Application Priority Data

Mar. 23, 2011 (JP) ................................. 2011-064980
Mar. 6, 2012 (JP) ................................. 2012-049635

(51) Int. Cl.
*H04N 13/00* (2006.01)
*G01C 3/08* (2006.01)
(Continued)

(52) U.S. Cl.
CPC .......... *H04N 13/0022* (2013.01); *G01C 3/085* (2013.01); *G01S 11/12* (2013.01); *G06T 7/0075* (2013.01); *G06T 2207/10012* (2013.01); *G06T 2207/10024* (2013.01); *G06T 2207/20021* (2013.01)

(58) Field of Classification Search
CPC ................... G01C 3/085; G01S 11/12; G06T 2207/10012; G06T 2207/10024; G06T 2207/20021; G06T 7/0075; H04N 13/0022
USPC .......................... 348/43, 46, 47, 48; 382/154
See application file for complete search history.

(56) References Cited

U.S. PATENT DOCUMENTS 4,448,510 A * 5/1984 Murakoshi ............. G03B 17/18
396/287
4,704,627 A * 11/1987 Yuyama et al. ................ 348/43
(Continued)

FOREIGN PATENT DOCUMENTS

JP 2000-028355 A 1/2000
JP 2001-082599 A 3/2001
(Continued)

*Primary Examiner* — Jay Patel
*Assistant Examiner* — Francis G Geroleo
(74) *Attorney, Agent, or Firm* — Birch, Stewart, Kolasch & Birch, LLP

(57) ABSTRACT

A disparity calculating device 100 obtains a base image from a first camera 1 and a reference image from a second camera 2. An image dividing unit 101 divides each of the base image and reference image into multiple regions in accordance with dividing conditions set by a condition setting unit 102. A correction amount determining 103 calculates image shift amount for each of the divided regions, and determines correction amount based on the images shift amount thereof. A disparity calculating unit 104 performs correction of the image on each region of divided base images and divided reference images obtained from the image dividing unit 101 based on correction amount determined by the correction amount determining unit 103 to obtain disparity based on the images after correction.

13 Claims, 20 Drawing Sheets

(51) Int. Cl.
*G01S 11/12* (2006.01)
*G06T 7/00* (2006.01)

(56) References Cited

U.S. PATENT DOCUMENTS

| | | |
|---|---|---|
| 6,552,742 B1 | 4/2003 | Seta |
| 6,671,399 B1* | 12/2003 | Berestov ............... 382/154 |
| 6,674,892 B1* | 1/2004 | Melen ..................... 348/42 |
| 8,009,898 B2* | 8/2011 | Kim ................. G06T 7/0022 |
| | | 348/135 |
| 8,970,672 B2* | 3/2015 | Goma .............. H04N 13/0003 |
| | | 348/46 |
| 2002/0196423 A1 | 12/2002 | Shima |
| 2006/0050383 A1* | 3/2006 | Takemoto et al. ........... 359/462 |
| 2006/0291849 A1* | 12/2006 | Shamir .................. G03B 7/08 |
| | | 396/334 |
| 2007/0248260 A1* | 10/2007 | Pockett ................... 382/154 |
| 2008/0117290 A1* | 5/2008 | Mazza ..................... 348/47 |
| 2008/0123938 A1* | 5/2008 | Kim ...................... 382/154 |
| 2009/0190800 A1* | 7/2009 | Takahashi ............... 382/154 |
| 2010/0150455 A1* | 6/2010 | Oyama ................... 382/219 |
| 2011/0085188 A1 | 4/2011 | Matsuoka |
| 2011/0211751 A1* | 9/2011 | Thorpe ................ G06T 7/002 |
| | | 382/154 |
| 2012/0327189 A1* | 12/2012 | Muramatsu et al. ........... 348/46 |
| 2013/0162641 A1* | 6/2013 | Zhang ............... H04N 13/0018 |
| | | 345/419 |

FOREIGN PATENT DOCUMENTS

| | | |
|---|---|---|
| JP | 2003-004442 A | 1/2003 |
| JP | 2003-256875 A | 9/2003 |
| JP | 2011-082955 A | 4/2011 |

* cited by examiner

| REGION 1 | REGION 2 | REGION 3 |
|---|---|---|
| 3 | 3 | 3 |
| REGION 4 | REGION 5 | REGION 6 |
| 4 | 4 | 4 |
| REGION 7 | REGION 8 | REGION 9 |
| 5 | 5 | 5 |

FIG. 9B

| REGION 1 | REGION 2 | REGION 3 |
|---|---|---|
| 0 | 0 | 0 |
| REGION 4 | REGION 5 | REGION 6 |
| 1 | 1 | 1 |
| REGION 7 | REGION 8 | REGION 9 |
| 2 | 2 | 2 |

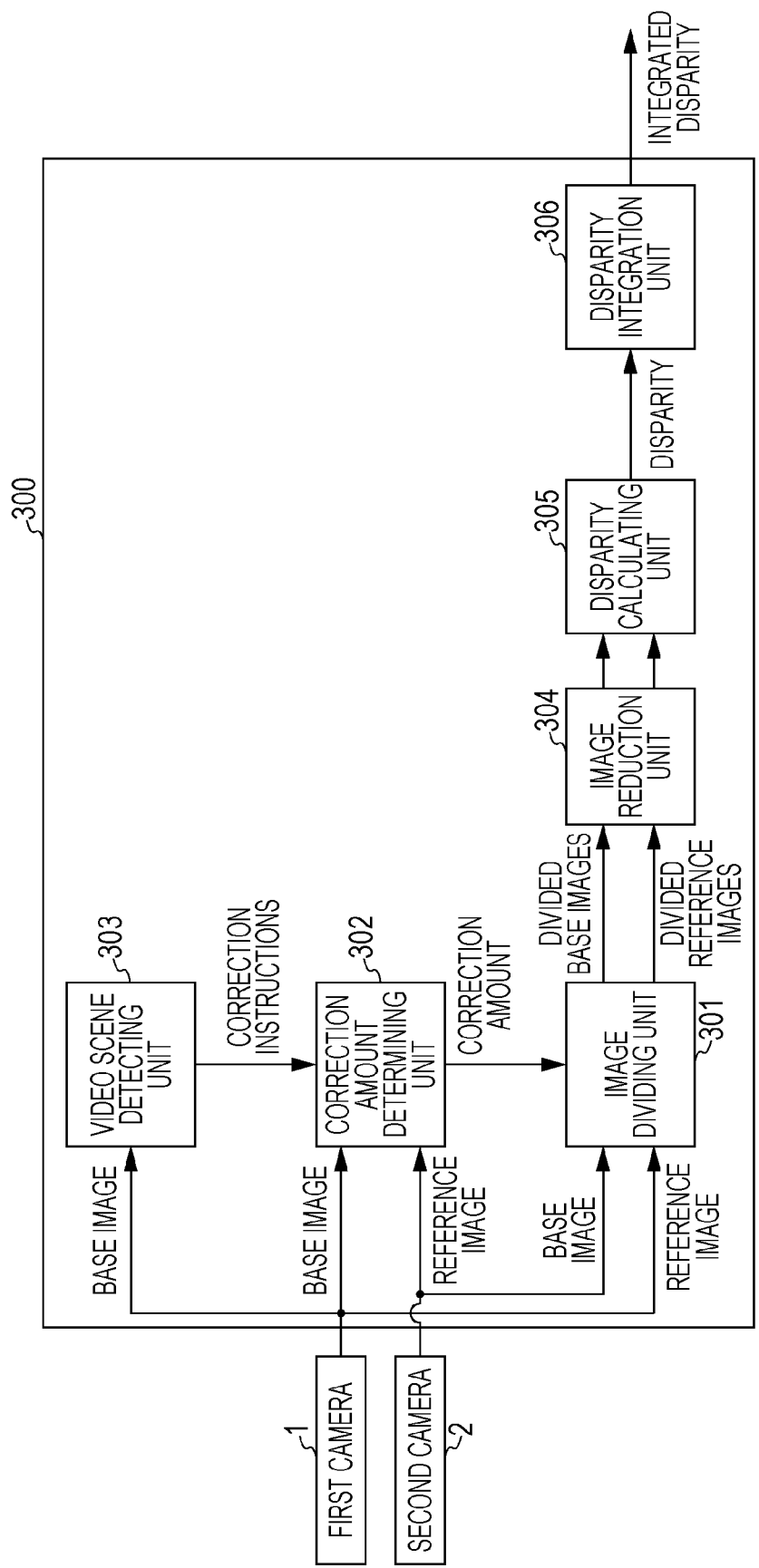

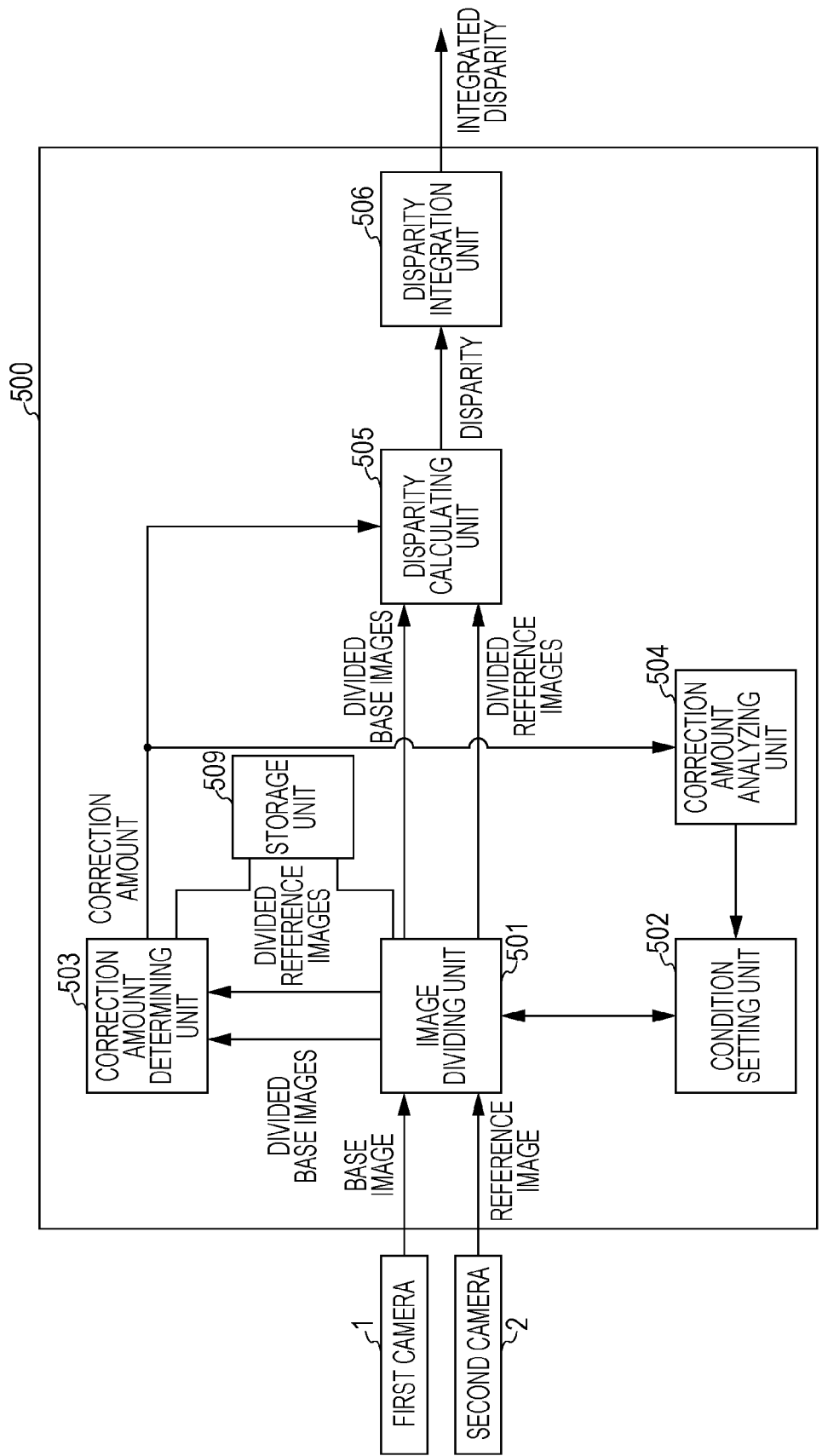

FIG. 20A
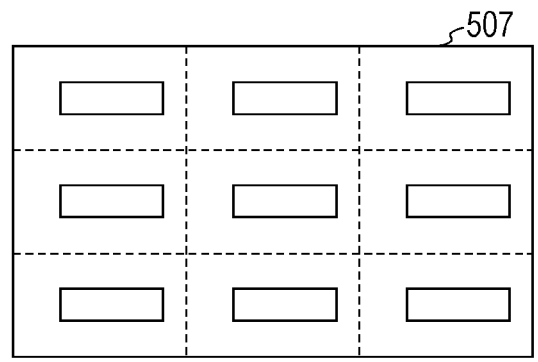
FIG. 20B
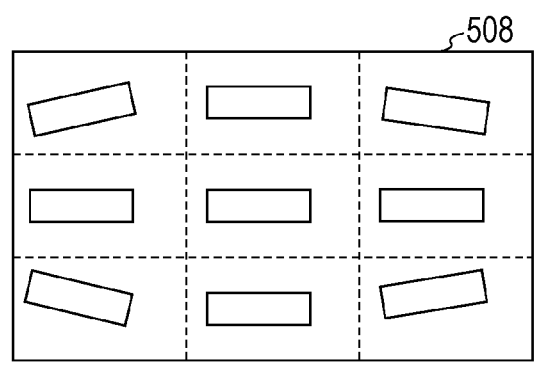
FIG. 21A
| 3 | 0 | 3 |
|---|---|---|
| 0 | 0 | 0 |
| −3 | 0 | −3 |

FIG. 23 "CONVENTIONAL ART"
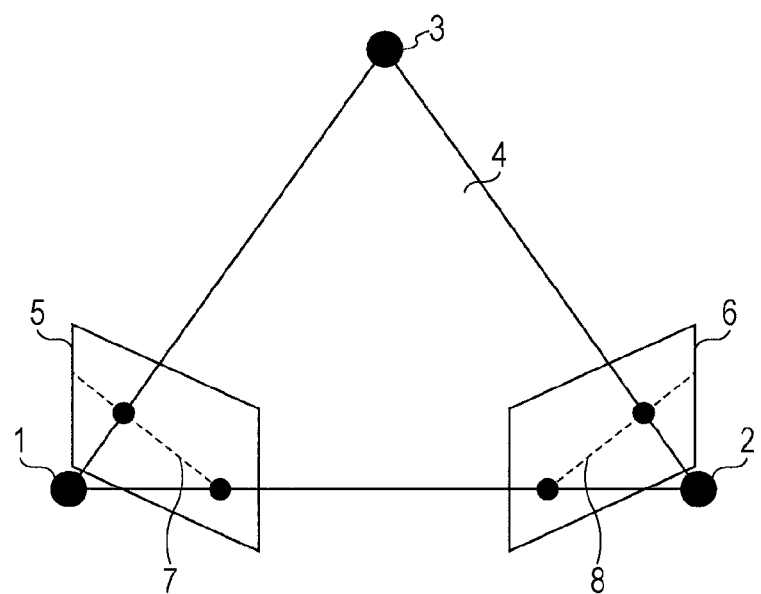
FIG. 24 "CONVENTIONAL ART"
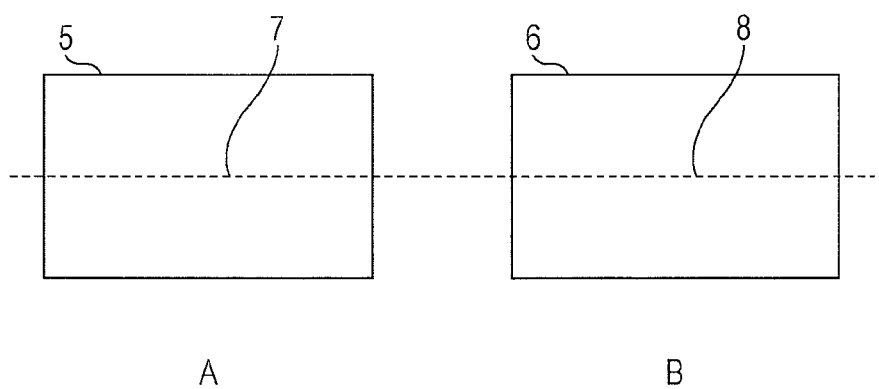
A　　　　　　　　　　B

DISPARITY CALCULATING DEVICE AND DISTANCE CALCULATING DEVICE

This application is the national phase under 35 U.S.C. §371 of PCT International Application No. PCT/JP2012/057320 which has an International filing date of Mar. 22, 2012 and designated the United States of America.

FIELD

The present invention relates to a disparity calculating device configured to shoot a subject using multiple cameras, and to calculate disparity from each camera image, a distance calculating device configured to calculate distance between cameras and a subject, and a disparity calculating method.

BACKGROUND

There has been known an imaging system configured to generate a stereoscopic image or free-viewpoint image based on multiple images obtained by imaging the same subject from multiple viewpoints using a camera. With this imaging system, there is performed processing to calculate distance information (depth information) of a subject from disparity that is relative shift amount between images using the principle of triangulation and to generate an image viewed from an optional virtual viewpoint based on distance information thereof.

In the event of calculating disparity between two images, generally, detection of corresponding points between two images is performed. As a method for detecting corresponding points, there have been known SAD method employing Sum Of Absolute Difference (SAD), or SSD method employing Sum of Squared Difference (SSD). With these methods, first, of two images, one of the images is taken as a base image, and the other is taken as a reference image. Also, a region including a point of interest within the base image is set as to this point of interest, and multiple regions having the same size as the region thereof are also set in the reference image. Next, a degree of correlation between the region within the base image and each region within the reference image is obtained by block matching, and a center point of a region within the reference image having the highest degree of correlation is detected as a corresponding point corresponding this point of interest. Detection of a corresponding point is performed by searching above an epipolar line. The epipolar line is a straight line where an epipolar plane, which is a plane including two viewpoints and a target point in space or above an object, intersects each of the images.

FIG. 23 is a schematic diagram illustrating an epipolar plane and epipolar lines.

Description will be made regarding a case where a target point 3 in space is shot by a first camera 1 which is a left camera and a second camera 2 which is a right camera, as an example. In this case, epipolar lines 7 and 8 are intersections between a triangular plane (epipolar plane) 4 made of three points of the target point 3 in space and two viewpoints (the centers of lenses of the first camera 1 and second camera 2), and three line segments connecting these, and an image plane 5 shot by the first camera 1 and between the triangular plane 4 and an image plane 6 shot by the second camera 2. A corresponding point within the other image corresponding to a point of interest within one of the images exists above an epipolar line, and accordingly, the corresponding point can be detected by searching above the epipolar line.

FIG. 24 are schematic diagrams illustrating a case where the first camera 1 and second camera 2 have been disposed so that the optical axes of the first camera 1 and second camera 2 become parallel. In this case, the epipolar lines 7 and 8 becomes horizontal straight lines having the same height in both image planes, and accordingly, a corresponding point can be searched above the same line in both images.

However, image shift may occur between the two images due to attachment precision of the two cameras, or distortion of lenses, or the like, and accordingly, the epipolar line in each camera does not necessarily become the same line within the two images. In the event that shift is not small, a corresponding point cannot be found, and regions where accurate disparity cannot be calculated increase. In order to accurately calculate disparity, image shift needs to be corrected, but a simple method wherein the entire screen is moved for adjustment, for example, is low in correction precision, and it is difficult to sufficiently correct image shift caused due to attachment precision of a camera, or distortion of a lens, or the like.

On the other hand, in PTL 1 (Japanese Unexamined Patent Application Publication No. 2001-82955), a device has been disclosed wherein rotational shift or translational shift of images is corrected in real-time using affine transformation which is geometric coordinate transformation. Also, in PTL 2 (Japanese Unexamined Patent Application Publication No. 2003-4442), a device has been disclosed wherein a second pattern having the highest correlation with a first pattern within one of images is detected out of multiple horizontal and vertical lines within the other image, and disparity is calculated from first and second position information of the first and second patterns. According to this device, search of a corresponding point is performed above horizontal lines and vertical lines within the image, and accordingly, incorrect ranging due to image shift can be prevented even without correcting the entire image.

SUMMARY

Resolution of cameras has also increased along with increase in resolution of image display devices. Therefore, disparity with high precision needs to be calculated regarding high resolution images as well. However, with the device disclosed in PTL 1, correction is performed on the entire image, and accordingly, calculation amount used for correction as to a high-resolution image is not small.

With the device disclosed in PTL 2, search in the horizontal direction and vertical direction is performed on the image, and accordingly, in the event of high-resolution images having a great number of pixels, disparity is greater than the case of low-resolution images, and along therewith, a search range for a corresponding point is widened. That is to say, the higher the resolution of an image is, the wider the search range is for a corresponding point, and consequently, calculation amount used for search of a corresponding point becomes great.

The present invention has been made in the light of such situations, and it is an object of the present invention to provide a disparity calculating device configured to readily calculate accurate disparity by dividing an image into multiple regions and correcting image shift for each region, and a distance calculating device configured to calculate distance between cameras and a subject based on the accurate disparity thereof, and a disparity calculating method.

Solution to Problem

A disparity calculating device according to the present invention configured to calculate disparity serving as image shift between images obtained from two viewpoints, includes: an image dividing unit configured to divide each of the images into multiple regions; a correction amount determining unit configured to calculate an image shift amount between the images in a direction perpendicular to a direction where two viewpoints are connected for each of the regions resulting from division by the image dividing unit, and to determine a correction amount corresponding to the image shift amount; and a disparity calculating unit configured to correct the images for each of the regions on the basis of the correction amount determined by the correction amount determining unit, and to calculate disparity on the basis of the corrected images.

According to the present invention, images are divided into multiple regions, and correction of image shift in the vertical direction is performed for each region, and accordingly, accurate disparity may readily be calculated.

The disparity calculating device according to the present invention further includes a correction instructing unit configured to instruct the correction amount determining unit to determine a correction amount. The correction amount determining unit is configured to determine a correction amount in accordance with an instruction from the correction instructing unit.

According to the present invention, image shift may be corrected at suitable timing in accordance with external conditions.

With the disparity calculating device according to the present invention, the correction instructing unit is configured to instruct the correction amount determining unit to determine a correction amount each time the correction instructing unit obtains a predetermined number of frames in a case where the images are moving image data.

According to the present invention, a processing amount for calculating disparity may be reduced, and power consumption may be reduced.

With the disparity calculating device according to the present invention, the correction instructing unit is configured to detect switching of a video scene, and in case of having detected switching of a video scene, to instruct the correction amount determining unit to determine a correction amount.

According to the present invention, a correction amount may be determined at the time of switching of a video scene where an image shift amount is changed.

With the disparity calculating device according to the present invention, the correction instructing unit is configured to detect acceleration, and in case of having detected acceleration equal to or higher than a predetermined threshold, to instruct the correction amount determining unit to determine a correction amount.

According to the present invention, image shift may be corrected in a case where a camera has moved due to change in a shooting scene or external impact or the like.

The disparity calculating device according to the present invention further includes a storage unit configured to store correction amounts of the individual regions. The correction amount determining unit is configured to determine a correction amount on the basis of the correction amounts in the past stored in the storage unit.

According to the present invention, processing for determining a correction amount may be reduced.

With the disparity calculating device according the present invention, in a case where directions of image shift for the individual regions are the same, the disparity calculating unit is configured to select a minimum value from among image shift amounts calculated for the individual regions, and to correct the images for each region after correcting the entire images in accordance with the minimum value.

According to the present invention, in a case where directions of image shift for the individual regions are the same, an image shift amount for each region is reduced by performing correction for all the regions on the basis of the minimum image shift amount, and accordingly, a corresponding point search range at the time of calculating disparity may be narrowed, and a calculation amount may be therefore reduced.

With the disparity calculating device according to the present invention, the image dividing unit is configured to divide a region so that the regions resulting from division have different sizes.

According to the present invention, even in a case where an image shift amount greatly differs depending on places within an image, a region having a different size is set depending on places within the image, and accordingly, correction may sensitively be performed in accordance with an image shift amount.

With the disparity calculating device according to the present invention, the image dividing unit is configured to divide the images so that regions at center portions of the images are greater than regions at surrounding portions of the images.

According to the present invention, the size of a region is small at a surrounding portion of an image, where an image shift amount is large due to distortion of a lens, and accordingly, correction may sensitively be performed, and disparity with high precision may be obtained.

The disparity calculating device according to the present invention further includes a difference calculating unit configured to calculate a difference in correction amount between adjacent regions on the basis of correction amounts of the individual regions determined by the correction amount determining unit. The image dividing unit is configured to further divide, in a case where the difference between regions calculated by the difference calculating unit is equal to or greater than a predetermined threshold, each of the regions.

According to the present invention, a region where an image shift amount determined from a difference in correction amount is large is further divided, and accordingly, correction may be performed more accurately.

With the disparity calculating device according to the present invention, the image dividing unit is configured to determine, in accordance with the difference calculated by the difference calculating unit, the number of regions into which each of the adjacent regions is to be divided, and to further divide the regions in accordance with the determined number.

According to the present invention, the number of regions resulting from division increases as an image shift amount due to distortion of a lens increases, and accordingly, correction may be accurately performed, and disparity may readily be calculated.

A distance calculating device according to the present invention includes the disparity calculating device; and a distance calculating unit configured to calculate, on the basis of disparity calculated by the disparity calculating device, a distance between the viewpoints and a subject.

According to the present invention, an accurate distance to a subject may readily be calculated.

A disparity calculating method according to the present invention includes: an image dividing step of dividing each of images obtained from two viewpoints into multiple regions; a correction amount determining step of calculating an image shift amount between the images in a direction perpendicular to a direction where two viewpoints are connected for each of the regions resulting from division in the image dividing step, and determining a correction amount corresponding to the image shift amount; and a disparity calculating step of correcting the images for each of the regions on the basis of the correction amount determined in the correction amount determining step, and calculating disparity between the images obtained from the two viewpoints on the basis of the corrected image.

According to the present invention, accurate disparity can readily be calculated.

Advantageous Effects of Invention

According to the present invention, an image is divided into multiple regions, correction of the image is performed for each region, and accordingly, accurate disparity can readily be calculated. Also, according to the present invention, a distance between cameras and a subject can be calculated on the basis of the accurate disparity thereof.

BRIEF DESCRIPTION OF THE DRAWINGS

FIG. 9A is an explanatory diagram illustrating image shift amount for every nine regions of divided reference images.

FIG. 9B is an explanatory diagram illustrating image shift amount for every nine regions of divided reference images.

FIG. 16 is a block diagram illustrating a configuration example of a disparity calculating device according to a third embodiment.

FIG. 19 is a block diagram illustrating a configuration example of a disparity calculating device according to a fifth embodiment.

FIG. 20A is an explanatory diagram illustrating a base image and a reference image.

FIG. 20B is an explanatory diagram illustrating a base image and a reference image.

FIG. 21A is an explanatory diagram illustrating correction amount of each region calculated by a correction amount determining unit.

FIG. 23 is a schematic diagram illustrating an epipolar plane and epipolar lines.

FIG. 24 is a schematic diagram illustrating a case where a first camera and a second camera are disposed so that the optical axes of the first camera and second camera become parallel.

DETAILED DESCRIPTION

First Embodiment

Hereinafter, a first embodiment will be described in detail with reference to the drawings.

Figure 1:
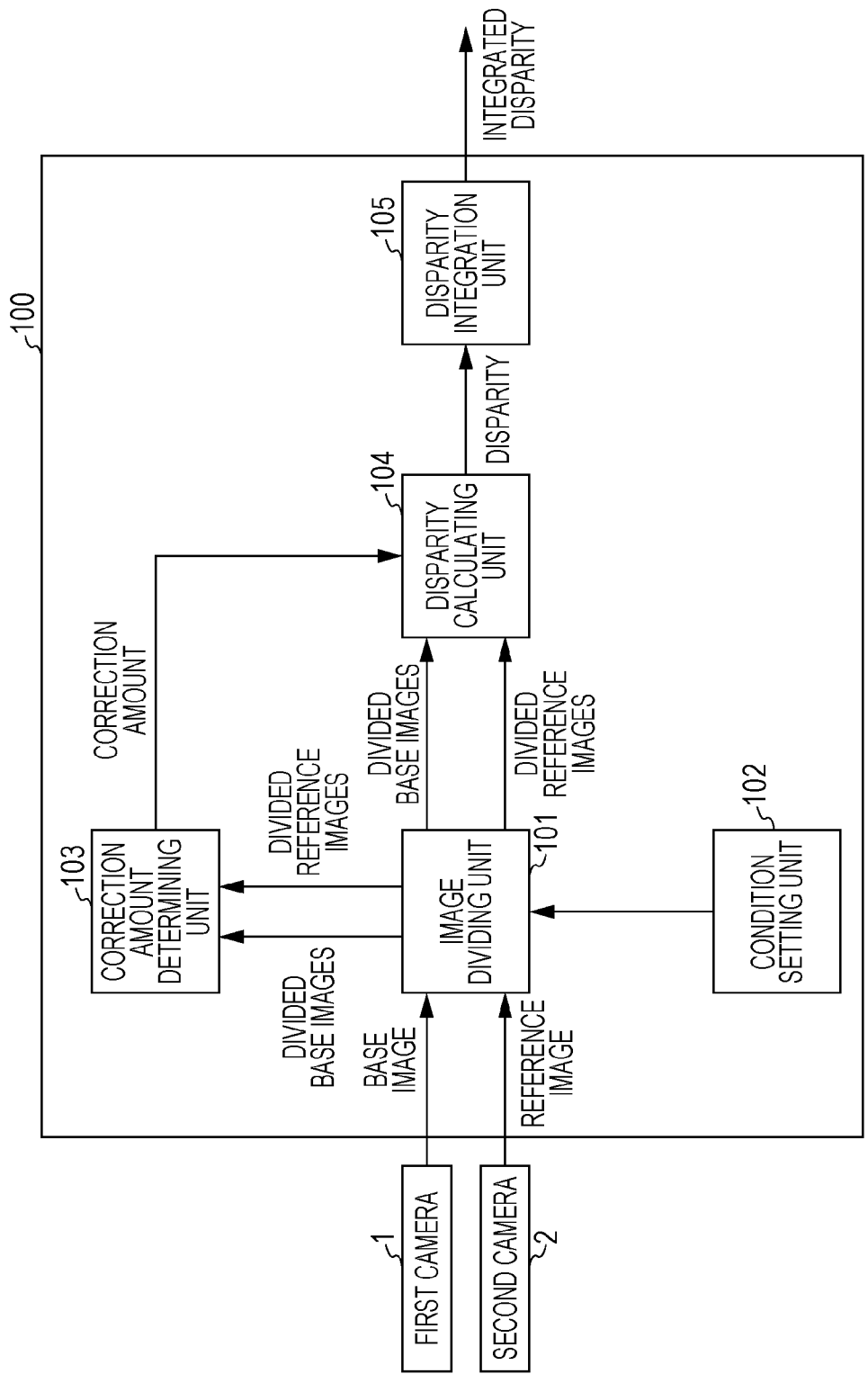
FIG. 1 is a block diagram illustrating a configuration example of a disparity calculating device according to a first embodiment.

FIG. 1 is a block diagram illustrating a configuration example of a disparity calculating device 100 according to the first embodiment.

A first camera 1 and a second camera 2 shoot the same subject at the same timing, and provide a base image and a reference image which are a shot pair of left and right to a disparity calculating device 100. Now, let us say that the image of the first camera 1 positioned closer to the left as to a subject is taken as a base image, and the image of the second camera 2 positioned closer to the right as to the subject is taken as a reference image. Also, let us say that the first camera 1 and second camera 2 are disposed in accordance with a parallel method. The parallel method is a method wherein the cameras are disposed at the same height so that the orientation of the two cameras, i.e., the optical axes of these become generally parallel.

The disparity calculating device 100 inputs the base image and reference image shot by the first camera 1 and second camera 2, and executes corresponding point search processing and disparity calculation processing using the base image and reference image.

The disparity calculating device 100 includes an image dividing unit 101, a condition setting unit 102, a correction amount determining unit 103, a disparity calculating unit 104, and a disparity integration unit 105.

The image dividing unit 101 divides the base image and reference image into multiple regions in accordance with the number of divisions set by the condition setting unit 102, and stores the divided base images (hereinafter, referred to as divided based images) and divided reference images (hereinafter, referred to as divided reference images) in a predetermined region in image memory (not illustrated).

The image dividing unit 101 provides the divided base images and divided reference images to the correction amount determining unit 103 and disparity calculating unit 104. The condition setting unit 102 sets the number of divisions of the images. Examples of the number of divisions include nine (vertically 3×horizontally 3), 16 (vertically 4×horizontally 4), and 25 (vertically 5×horizontally 5). That is to say, the image dividing unit 101 divides each of the base image and reference image into nine regions, 16 regions, 25 regions, or the like.

The correction amount determining unit 103 obtains the divided base images and divided reference images from the image dividing unit 101. In the event that there is image shift in the vertical direction between the divided base images and divided reference images due to attachment precision of the cameras 1 and 2, difference in precision of the lenses thereof, or the like, the correction amount determining unit 103 calculates image shift amount between the divided base images and divided reference images, and determines correction amount for reducing image shift, for each region. The correction amount determining unit 103 provides the correction amount for each region to the disparity calculating unit 104. Now, the image shift in the vertical direction means shift between two imaged images existing in the vertical direction as to a direction where the two cameras are separated, for example. This is, in terms of a case where a person sees an image, image shift between images in a direction perpendicular to a direction connecting two viewpoints.

The disparity calculating unit 104 receives the correction amount for each region from the correction amount determining unit 103, and reads out divided base images and divided reference images from the image memory according to the correction amount thereof. Specifically, the disparity calculating unit 104 reads out, from a storage region where the image of each region of the divided base images is stored, this image, and also reads out, from a storage region where the image of each region of the divided reference images is stored, the divided reference image, and calculates disparity by changing a line where corresponding point search is performed according to the correction amount.

The disparity calculating unit 104 corrects the divided reference images in accordance with the correction amount received from the correction amount determining unit 103, performs corresponding point search using the divided reference images and divided reference images after correction, and calculates disparity for each region. The disparity calculating unit 104 provides the calculated disparity for each region to the disparity integration unit 105. Note that the disparity mentioned here means difference in positions of images viewed by the right eye and left eye, and is relative image shift amount between the images.

The disparity integration unit 105 integrates the disparity for each region received from the disparity calculating unit 104, and obtains disparity in accordance with the image sizes before division. This will be referred to as integrated disparity.

First, description will be made regarding a disparity calculating method in the event that image shift in the vertical direction has not occurred between the divided base images and divided reference images.

Figure 2:
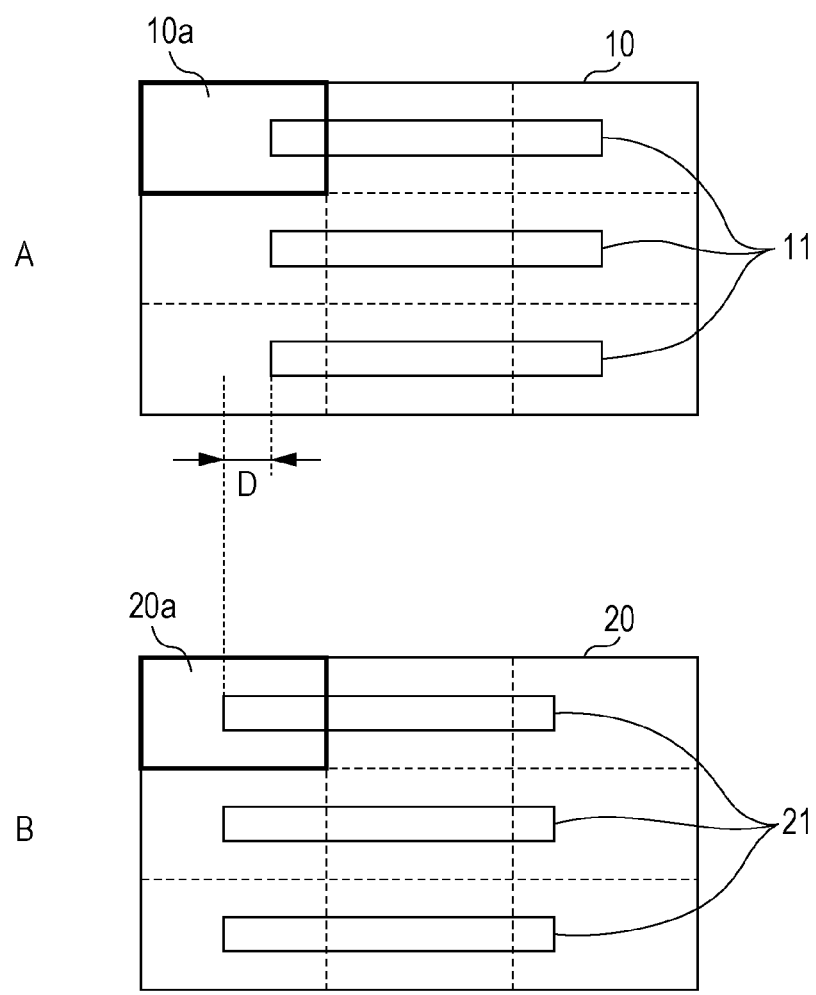
FIG. 2 is an explanatory diagram schematically illustrating divided base images and divided reference images.

FIG. 2 is an explanatory diagram schematically illustrating divided base images and divided reference images.

FIG. 2A illustrates divided base images, and FIG. 2B illustrates divided reference images. The image dividing unit 101 divides each of the base image and reference image into nine regions, for example.

A divided base image 10 and divided reference image 20 include subject images 11 and subject images 21 that indicate the same subject. Here, let us say that a background portion other than a subject image is an even colored background, and the subject images 11 and 21 are made up of three oblong rectangles. The lens positions (viewpoints) of the first camera 1 and second camera 2 differ, and accordingly, the subject image 21 within the divided reference image 20 shot by the second camera 2 positioned closer to the right as to the subject exists in a position shifted in the left direction as to the subject images 11 within the divided reference image 10 shot by the first camera 1 positioned closer to the left as to the subject. Now, in the event of focusing on a region 10a within the divided base image 10, and a region 20a within the divided reference image 20, a part of the subject image 21 within the region 20a of the divided reference image 20 exists in a position shifted by width D in the left direction as to a part of the subject image 11 within the region 10a of the divided base image 10. The width D is disparity between the divided base images and divided reference images, and is represented with the number of pixels. With the present example, disparity is D pixels. The first camera 1 and second camera 2 are disposed in parallel without convergence, and accordingly, disparity is infinite distance and becomes 0, the closer to a camera a subject is, the greater disparity becomes. Convergence is a kind of eye movement, and is movement of both eyes to attempt to intersect the line of sight on an object, and with cameras, means that the optical axes of the cameras intersect.

Figure 3:
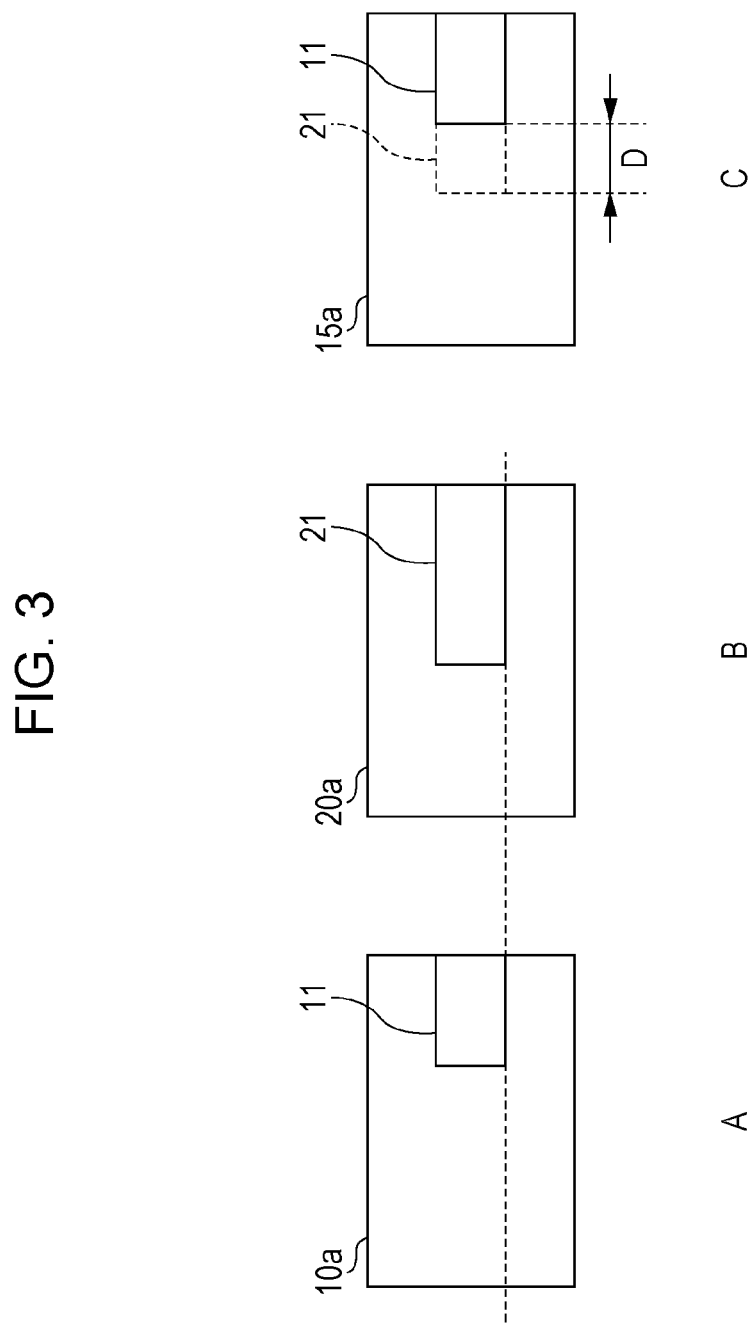
FIG. 3 is an explanatory diagram schematically illustrating one region of divided base images and divided reference images illustrated in FIG. 2, and a part of a subject image included therein.

FIG. 3 is an explanatory diagram schematically illustrating one region of divided base images and divided reference images illustrated in FIG. 2, and a part of a subject image included therein.

FIG. 3A schematically illustrates one region within the divided base images and a part of a subject image included therein, FIG. 3B schematically illustrates one region within the divided reference images and a part of a subject image included therein, and FIG. 3C schematically illustrates a state in which one regions and parts of the subject images illustrated in FIG. 3A and FIG. 3B are superimposed.

In FIG. 3, a region 10a within the divided base image 10 includes a part of the subject image 11, and a region 20a within the divided reference image 20 includes a part of the subject image 21. A region 15a virtually represents a state in which the region 10a and region 20a are superimposed. As can be expected from the region 15a, there is disparity D between the region 10a and region 20a.

Hereinafter, a technique for obtaining the disparity D will be described.

The part of the subject image 11 included in the region 10a within the divided base image 10, and the part of the subject image 21 included in the region 20a within the divided reference image 20 are positioned above a horizontal line where the coordinates in the vertical direction within both images are the same (hereinafter, referred to as "same line"). Therefore, the disparity calculating unit 104 sets a point of interest (optional point) within the part of the subject image 11 included in the region 10a within the divided base image 10, and searches for a corresponding point corresponding to the point of interest within the part of the subject image 21. Specifically, the disparity calculating unit 104 performs block matching with a predetermined size of pixel block on the part of the subject image 11 and the part of the subject image 21. The disparity calculating unit 104 performs block matching above the same line, obtains a degree of correlation between corresponding pixel blocks, and detects a corresponding point.

The disparity calculating unit 104 detects a corresponding point corresponding to the point of interest based on the degree of correlation, and obtains distance between the point of interest and the corresponding point, that is, disparity. The disparity calculating unit 104 detects a corresponding point by performing block matching on even another region within the divided base regions 10 and divided reference image 20 in the same way, thereby detecting a corresponding point, and obtaining disparity for each region from the point of interest and the corresponding point.

Next, the above corresponding point search will be described.

Figure 4:
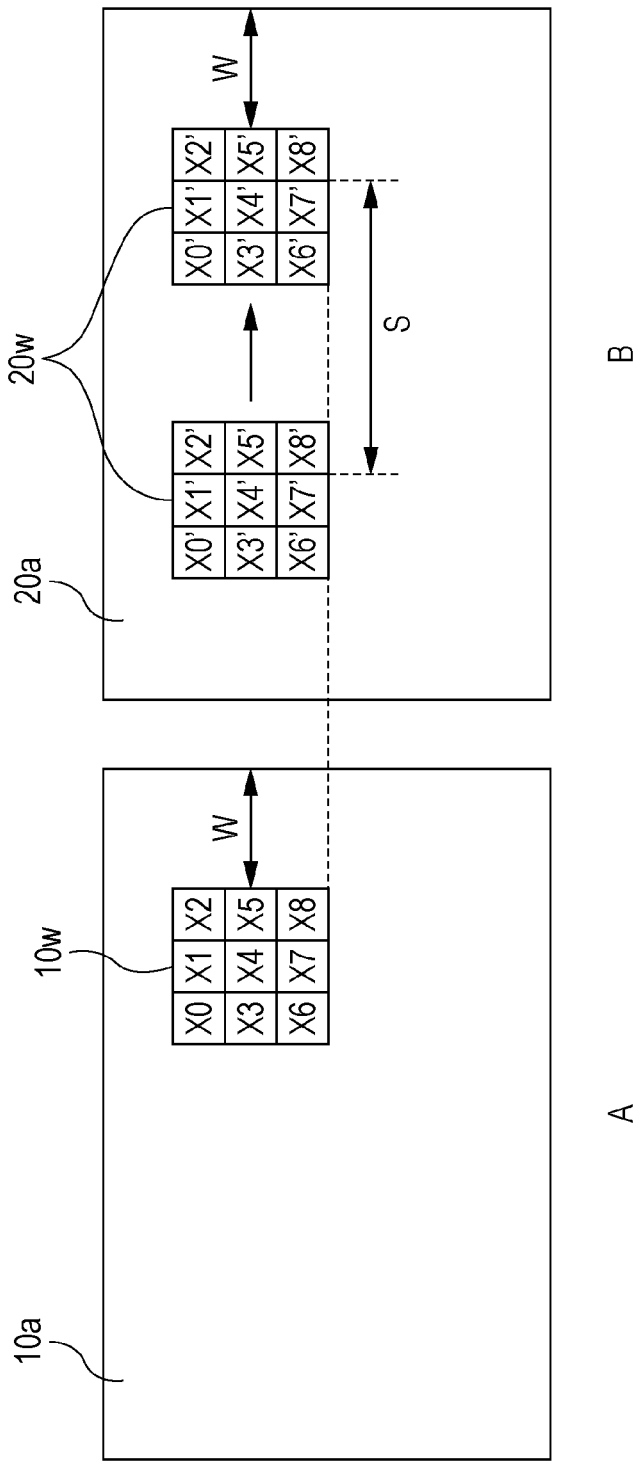
FIG. 4 is an explanatory diagram schematically illustrating block matching.

FIG. 4 is an explanatory diagram schematically illustrating block matching.

The disparity calculating unit 104 sets a base image window 10w to the region 10a within the divided base image 10, and sets a reference image window 20w to the region 20a within the divided reference image 20. The base image window 10w and reference image window 20w are positioned above the same line (dotted line). In FIG. 4, the base image window 10w and reference image window 20w extract a pixel block made up of 3×3 pixels from an image included in the region 10a and region 20a, respectively. The point of interest exists in the barycentric position (center position) of the pixel block extracted from the base image window 10w.

The disparity calculating unit 104 obtains, from the pixel block extracted using the base image window 10w, the pixel value of a pixel included in this pixel block. Similarly, the disparity calculating unit 104 obtains, from the pixel block extracted using the reference image window 20w, the pixel value of a pixel included in this pixel block.

The disparity calculating unit 104 extracts a pixel block having the same size (3×3 pixels) from each of the region 10a and region 20a while moving the base image window 10w and reference image window 20w in the horizontal direction, and performs block matching on the extracted pixel blocks, and obtains the degree of correlation of both pixel blocks. The degree of correlation can be obtained by correlation value computation according to the SAD method, for example. With the SAD method, the degree of correlation is represented with an SAD value. The SAD value is a value by obtaining a difference absolute value of the pixel value of a corresponding pixel in the two pixel blocks extracted by the base image window 10w and reference image window 20w for each corresponding pixel, and adding these difference absolute values across all pixels within both windows.

In the event that the pixel block extracted by the base image window 10w includes pixel values X0 to X8, and the pixel block extracted by the reference image window 20w includes pixel values X'0 to X'8, the SAD value is obtained from the following expression.

$$SAD = \sum_{i=0}^{3 \times 3 - 1} (|x_i - x'_i|)$$ [Math. 1]

As can be expected from the above expression, the smaller the SAD value is, the higher the degree of correlation between both pixel blocks is, and the greater the SAD value is, the lower the degree of correlation is. That is to say, the degree of correlation of the pixel blocks extracted by the base image window 10w and reference image window 20w is determined based on the magnitude of the SAD value.

Note that, in the event that the base image and reference image are monochrome images, the SAD value can be calculated using the pixel values of the monochrome images, and in the event that the base image and reference image are RGB images, the SAD value can be calculated using the pixel values of at least one color of R (red), G (green), and B (blue). Also, an arrangement may be made wherein information of RGB is converted into luminance information or the like, and the SAD value is calculated therewith.

Processing for detecting a corresponding point will be described in detail with reference to FIG. 4.

The disparity calculating unit 104 first sets the base image window 10w to a position separated from the right edge of the region 10a by distance W, and fixes the base image window 10w to the position thereof. The disparity calculating unit 104 sets the reference image window 20w to a position separated from the right edge of the region 20a by distance (W+S). The disparity calculating unit 104 sets width S as a search range, and performs block matching between pixel blocks within the base image window 10w and within the reference image window 20w while moving the reference image window 20w one pixel at a time within the search range thereof.

Note that, in the event that the cameras have been installed in parallel as with the present embodiment, the longer the camera base length, the greater disparity. Also, the shorter depth distance of a subject is, the greater the disparity is, and the closer to infinite distance depth distance of a subject is, the closer to 0 the disparity is. Accordingly, it is desirable to set a search range according to camera base length or depth distance from the camera to a subject, the longer the base length or the longer the depth distance, the greater disparity. For example, there is a method wherein the maximum value of the search range is set beforehand, in the event that the depth distance of the subject is equal to or shorter than 1 meter, the search range is set to the maximum value, and in the event of equal to or longer than 1 meter, the search range is set to around a half of the maximum value.

The disparity calculating unit 104 performs, in a state in which the base image window 10w is fixed to a position separated from the right edge of the region 10a by distance W, block matching while moving the reference image window 20w from a position separated from the right edge of the region 20a by distance (W+S) to a position separated from this right edge by distance W in the right direction one pixel at a time. The disparity calculating unit 104 determines a pixel block to be extracted by the base image window 10w fixed within the region 10a, and the smallest SAD value (minimum SAD value), that is, a pixel block having the highest correction degree, within the region 20a. A corresponding point corresponding to the point of interest positioned in the center of the pixel block extracted by the base image window 10w is positioned in the center of the determined pixel block thereof. In this manner, the disparity calculating unit 104 detects the corresponding point.

The disparity calculating unit 104 calculates disparity from distance between the point of interest and the corresponding point thereof for each region, and calculates disparity regarding all of the pixels of the base image 10.

Note that, with the example illustrated in FIG. 4, the base image window 10w and reference image window 20w has been set to a size corresponding to a pixel block of 3×3 pixels, but the size of each window may be set to various window sizes such as a size corresponding to a pixel block of 5×5 pixels or 9×9 pixels, or a size corresponding to a pixel block of which the vertical and horizontal pixel numbers are even numbers such as 4×4 pixels, or the like.

With the above example, the reference image window 20w has been moved to the right direction, but may be moved to the left direction. Specifically, an arrangement may be made wherein block matching is performed while moving the reference image window 20w from a position separated from the right edge of the region 20a by distance W to a position separated from this right edge by distance (W+S) one pixel at a time in the left direction.

Description has been made so far regarding the corresponding point search technique in the event that there is no image shift in the vertical direction between the divided base images and divided reference images. As described above, in the event that there is no image shift, corresponding point search can be simply performed above the same line between both images.

Next, description will be made regarding a corresponding point search technique in the event that there is image shift in the vertical direction between the divided base image and divided reference image. Image shift in the vertical direction occurs in the event that there is distortion in the lens, in the event that the attachment precision of the camera is low, in the event that the camera itself is inclined at a portion where the camera has originally to be disposed in parallel without shift, or in the event that the camera is disposed shifted in the vertical direction, or the like. In the event that image shift in the vertical direction is left as it is, and corresponding point search is performed above the same line as described above, there is a high probability that a corresponding point will erroneously be detected since there is no corresponding point above the same line, and accurate disparity cannot be calculated. Therefore, the disparity calculating unit 104 performs corresponding point search after correcting image shift in the vertical direction, and calculates disparity. Hereinafter, description will be made in detail regarding processing for correcting image shift in the vertical direction, and so forth.

In the event that there is no image shift in the vertical direction, the point of interest and a corresponding point corresponding thereto exist above the same line, but in the event that there is image shift in the vertical direction, the point of interest and a corresponding point corresponding thereto do not exist above the same line. Therefore, the correction amount determining unit 103 calculates image shift amount in the vertical direction between the divided base image and divided reference image for each region, and determines correction amount of the divided reference image based on the image shift amount thereof for each region. The disparity calculating unit 104 receives the correction amount from the correction amount determining unit 103, corrects the divided reference image based on the correction amount thereof, and performs corresponding point search using the divided base image and the divided reference image after correction.

First, description will be made regarding a state in which there is image shift in the vertical direction between the divided base image and divided reference image, as an example.

Figure 5:
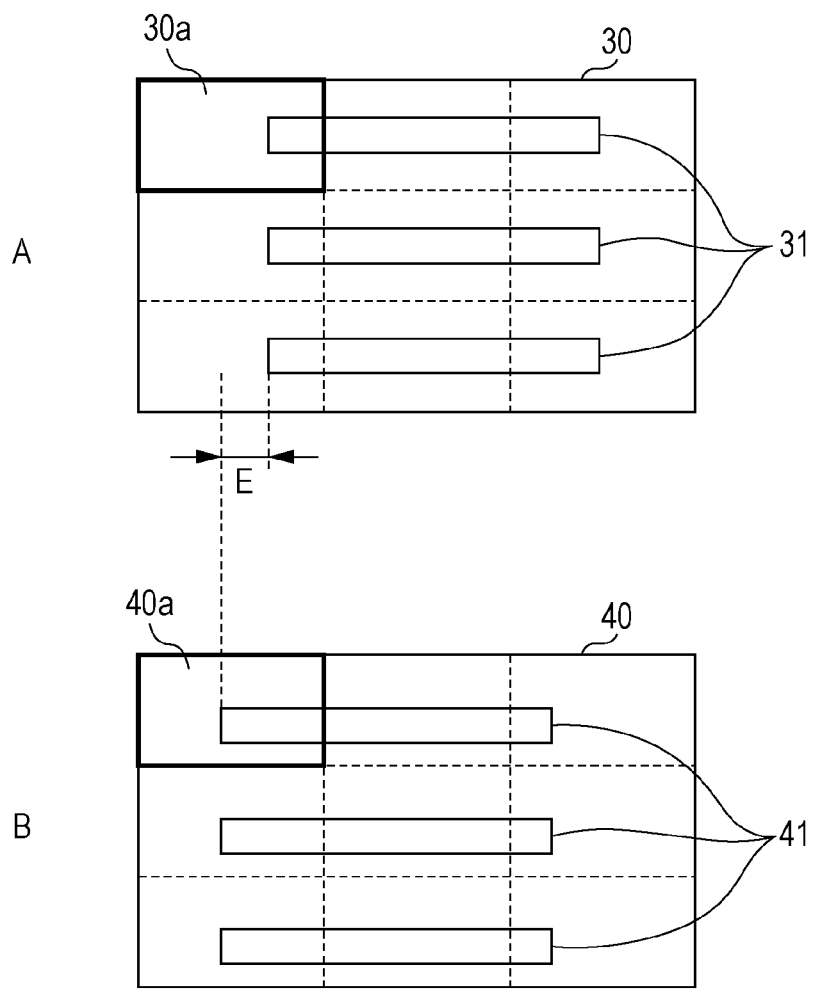
FIG. 5 is an explanatory diagram schematically illustrating divided base images and divided reference images.

FIG. 5 is an explanatory diagram schematically illustrating a divided base image and a divided reference image.

FIG. 5A illustrates a divided base image, and FIG. 5B illustrates a divided reference image. The image dividing unit 101 divides each of the base image and reference image into nine regions, for example.

A divided base image 30 and divided reference image 40 include subject images 31 and subject images 41, respectively. The subject images 31 and 41 are made up of three oblong rectangles, for example. The lens positions (viewpoints) of the first camera 1 and second camera 2 differ, and also there is difference in camera attachment precision or lens precision or the like, and accordingly, the subject images 41 within the divided reference image 40 exist in a position shifted in the left direction and also in the downward direction as to the subject images 31 within the divided base image 30. There is image shift in the vertical direction between the divided base image 30 and divided reference image 40.

Figure 6:
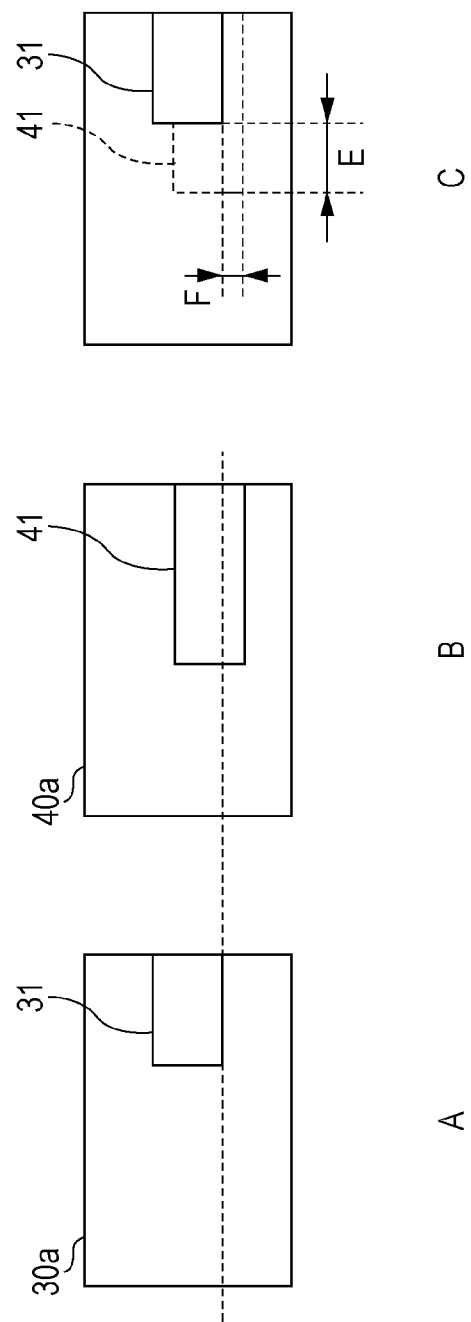
FIG. 6 is an explanatory diagram schematically illustrating one region of divided base images and divided reference images illustrated in FIG. 5, and a part of a subject image included therein.

FIG. 6 is an explanatory diagram schematically illustrating one region within the divided base image and the divided reference image illustrated in FIG. 5, and a part of a subject image included therein.

FIG. 6A schematically illustrates one region within the divided base image and a part of a subject image included therein, FIG. 6B schematically illustrates one region within the divided reference image and a part of a subject image included therein, and FIG. 6C schematically illustrates a state in which regions and subject images illustrated in each of FIG. 6A and FIG. 6B are superimposed.

A region 30a includes a part of the subject images 31, and a region 40a includes a part of the subject images 41.

As can be expected from FIG. 6C, the subject image 41 within the region 40a is shifted in the left direction by E pixels as to the subject image 31 within the region 30a, and also shifted in the downward direction by F pixels. Shift in the left direction is disparity, and shift in the downward direction is image shift in the vertical direction caused due to difference in camera attachment precision or lens precision or the like. In the event of performing block matching in the horizontal direction above described in a state in which partial image shift in the vertical direction occurs in this manner, a corresponding point cannot be detected, and accurate disparity may not be able to be calculated. The shape and color of a portion near the center in the vertical direction edge of the left edge of the subject image 31 are generally the same as the shape and color of the left edge of the subject image 41, and accordingly, disparity corresponding to the point of interest positioned in this portion may be correctly detected by block matching in the horizontal direction described above. However, a corresponding point corresponding to the point of interest positioned in a portion of the upper left corner of the subject image 31 does not exist above the same line, and accordingly, there is a high possibility that a corresponding point will erroneously be detected. Therefore, the accuracy of disparity to be obtained from all of the images of the divided base image 30 and divided reference image 40 is not high.

Next, description will be made regarding a state in which great image shift in the vertical direction occurs between the divided base image 30 and divided reference image 40, as an example.

Figure 7:
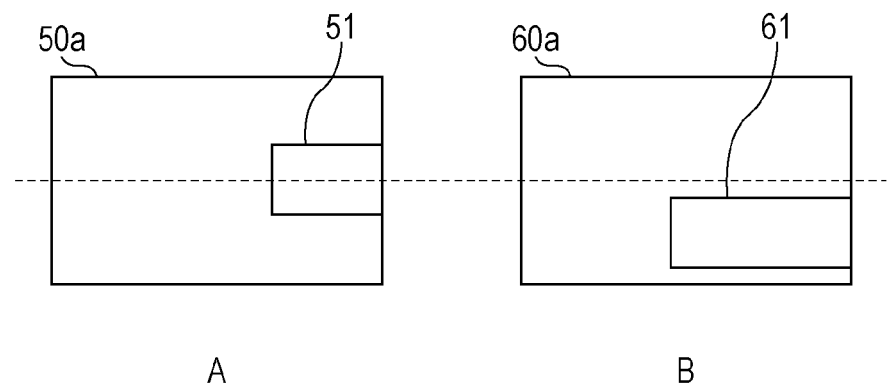
FIG. 7 is an explanatory diagram schematically illustrating one region of divided base images and divided reference images, a part of a subject image included therein.

FIG. 7 is an explanatory diagram schematically illustrating one region of a divided base image and divided reference image, and a part of a subject image included therein.

FIG. 7A illustrates one region within the divided base image and a part of a subject image included therein, FIG. 7B illustrates one region within the divided reference image and a part of a subject image included therein.

A region 50a is a region within the divided base image 30, and a region 60a is a region within the divided reference image 40. The region 50a includes a part of a subject image 51, and the region 60a includes a part of a subject image 61.

As can be expected from FIG. 7, the subject image 61 within the region 60a is greatly shifted in the vertical direction as to the subject image 51 within the region 50a. In the event of performing block matching in the horizontal direction described above in a state in which complete image shift in the vertical direction has occurred between the divided base image 30 and divided reference image 40, there is a significantly high possibility that a corresponding point will erroneously be detected. Therefore, it is even more difficult to calculate accurate disparity as compared to a case where there is partial image shift in the vertical direction between the divided base image 30 and divided reference image 40.

In the event that there is image shift in the vertical direction between the divided base image 30 and divided reference image 40 in this manner, there may be a possibility that a corresponding point will be erroneously detected, and it is difficult to calculate accurate disparity. Therefore, the correction amount determining unit 103 calculates image shift amount in the vertical direction between the divided base image 30 and divided reference image 40 for each region with the center line in the horizontal direction of each region within the divided base image 30 as basis, determines correction amount based on the image shift amount for each region, and provides to the disparity calculating unit 104. The disparity calculating unit 104 corrects the divided reference image 40 based on the correction amount received from the correction amount determining unit 103, and performs corresponding point search using the divided reference image after correction. Hereinafter, the processing thereof will be described in detail.

Figure 8A:
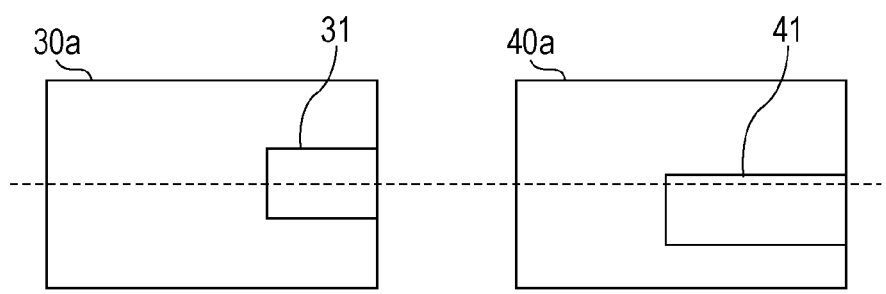
FIG. 8A is an explanatory diagram for describing correction of image shift in the vertical direction.
Figure 8B:
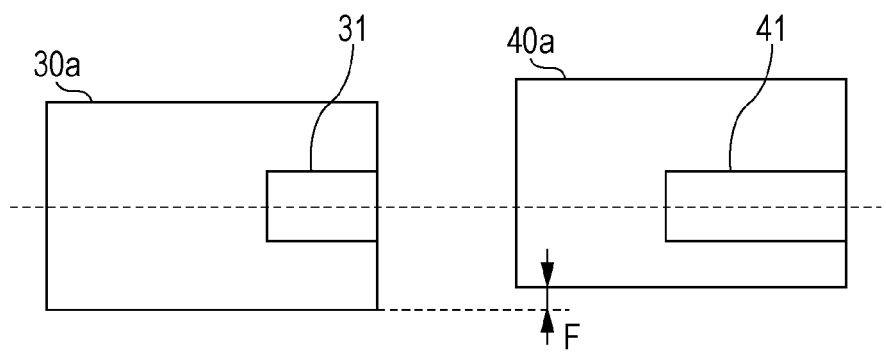
FIG. 8B is an explanatory diagram for describing correction of image shift in the vertical direction.

FIG. 8A and FIG. 8B are explanatory diagrams for describing correction of image shift in the vertical direction.

FIG. 8A illustrates one region within a divided base image and a divided reference image, and FIG. 8B illustrates a divided base image and one region within a divided reference image after correction.

In FIG. 8A, a region 30a within the divided base image 30 includes a part of the subject image 31, and a region 40a within the divided reference image 40 includes a part of the subject image 41.

The correction amount determining unit 103 sets a base image window configured to extract a pixel block of 3×3 pixels onto the center line (dotted line) of the region 30a within the divided base image 30, and sets a reference image window configured to extract a pixel block of 3×3 pixels onto the center line (dotted line) of the region 40a within the divided reference image 40.

The correction amount determining unit 103 fixes the position of the reference image window, performs block matching while moving the position of the reference image window in the horizontal direction along the center line one pixel at a time, and obtains an SAD value in each position. In the event that a search range up to a corresponding point corresponding to a certain point of interest is detected is, for example, length of 10 pixels, the correction amount determining unit 103 obtains 10 SAD values, and selects the least SAD value out of these SAD values.

The correction amount determining unit 103 moves the base image window in the horizontal direction one pixel, and fixes this, and repeats calculation of the least SAD value by performing block matching while moving the reference image window in the horizontal direction one pixel at a time again.

In this manner, the correction amount determining unit 103 obtains SAD values equivalent to the search range at each pixel of the base image, and calculates the least SAD value out of the SAD values thereof. That is to say, the correction amount determining unit 103 obtains least SAD values of which the number is equal to the number of pixels equivalent to movement amount of the moved base image window. The correction amount determining unit 103 adds all of the obtained least SAD values to obtain sum of the least SAD values. This sum of the least SAD values is a value to be obtained by performing block matching in the state illustrated in FIG. 8A.

Next, the correction amount determining unit 103 moves the region 40a within the divided reference image 40 upward one pixel, performs the same processing as described above to obtain sum of the least SAD values. Movement is different corresponding point search with the same line described in the basic corresponding point search method, and is equivalent to shifting the center line of the reference image window configured to perform corresponding point search in the vertical direction as to a line serving as the center of the reference image window, which is simple processing. Now, let us say that the correction amount determining unit 103 moves the region 40a within the divided reference image 40 in the upward and downward directions five pixels at each direction.

The correction amount determining unit 103 obtains the summation of the least SAD values each time the correction amount determining unit 103 moves the region 40a of the divided reference image 40 one pixel. As a result thereof, the correction amount determining unit 103 obtains F summations of the least SAD values. The correction amount determining unit 103 selects the summation of the smallest least SAD value out of the summations of the least SAD values. Movement amount of the region 40a at the time of the summation of the smallest least SAD values thereof being obtained is equivalent to image shift amount in the vertical direction.

For example, the correction amount determining unit 103 obtains summation of the least SAD values each time the correction amount determining unit 103 moves the divided reference image 40 in the vertical direction one pixel at a time in a range of −5 pixels to +5 pixels, determines a case where summation of the least SAD values becomes the minimum, and takes movement amount of the region 40a as image shift amount. In the event that summation of the least SAD values when moving the region 40a in the upward direction two pixels is the minimum for example, image shift amount F illustrated in FIG. 8B is two pixels, and correction amount is determined to be +2. Now, let us say that the sign of correction amount in the event of moving the region 40a in the upward direction is taken as +, and the sign of correction amount in the event of moving the region 40a in the downward direction is taken as −.

In this manner, the correction amount determining unit 103 obtains image shift amount between the divided base image and divided reference image for each region to determine correction amount, and transmits to the disparity calculating unit 104. The disparity calculating unit 104 performs corresponding point search after moving the divided reference image in accordance with the correction amount. Thus, a possibility that the corresponding point of each image will exist above the same line increases, and accordingly, accurate disparity can be calculated before correction.

The disparity calculating unit 104 provides the disparity calculated for each region to the disparity integration unit 105. The disparity integration unit 105 integrates disparity for each region received from the disparity calculating unit 104, and obtains integrated disparity adapted to the image size before division. That is to say, at the disparity integration unit 105, disparity for each region is integrated as disparity data (disparity map) corresponding to each pixel of the base image.

In the event that images of all of the regions within the divided reference image 40 are all shifted in the same direction (one of upward direction or downward direction), though image shift amount differs, as to the images of the corresponding regions within the divided based image 30, the correction amount determining unit 103 selects the least image shift amount out of image shift amount obtained for each region, and may determine correction amount according to the least image shift amount. In this case, the disparity calculating unit 104 moves the images of all of the regions within the divided reference image by an amount equivalent to the least image shift amount, and then corrects the images of all of the regions within the divided reference image in accordance with correction amount of each region as to the images after movement, and then performs corresponding point search to calculate disparity. Hereinafter, processing thereof will be described in detail.

FIG. 9A and FIG. 9B are explanatory diagrams illustrating image shift amount for every nine regions within a divided reference image.

FIG. 9A illustrates image shift amount of nine regions within a divided reference image before correction for each region. Now, let us say that regions 1 to 3 within the divided reference image 40 are shifted as to regions 1 to 3 within the divided base image 30 in the downward direction three pixels, regions 4 to 6 within the divided reference image 40 are shifted as to regions 4 to 6 within the divided base image 30 in the downward direction four pixels, and regions 7 to 9 within the divided reference image 40 are shifted as to regions 7 to 9 within the divided base image 30 in the downward direction five pixels. In this case, the least image shift amount is three pixels, and accordingly, all of the nine regions within the divided reference image are shifted in the upward direction three pixels.

FIG. 9B illustrates image shift amount of each region after moving all of the nine regions of the divided reference image in the upward direction three pixels. As can be expected from FIG. 9B, all of the nine regions of the divided reference image are moved in the upward direction three pixels, whereby image shift amount of the regions 1 to 3 within the divided reference image 40 becomes 0, image shift amount of the regions 4 to 6 becomes one pixel, and image shift amount of the regions 7 to 9 becomes two pixels. That is to say, all of the regions within the divided reference image are moved by an amount equivalent to the least image shift amount, whereby the maximum value of image shift amount becomes two pixels, and image shift amount is globally reduced. Accordingly, at the time of the next correction amount calculation, it is desirable to calculate image shift amount in a narrower range in the upward and downward directions, which leads to reduction of processing amount in a high-resolution image. Also, for example, at the time of activating the cameras, the entire image is subjected to the above least image shift amount equivalent to correction to reduce image shift amount. Thus, in the event that impact or the like has newly been applied to the cameras, and new image shift has occurred, image shift amount is originally set small, and accordingly, even in the event that great shift has occurred, image shift amount can be calculated in a relatively narrower range in the upward and downward directions.

With the first embodiment, unlike a technique for correcting image shift in increments of pixels, image shift is corrected in increments of regions, and accordingly, processing amount is not significantly increased even when processing an image having a great number of pixels, that is, a high-resolution image. Accordingly, the higher the resolution of an image, the greater difference between processing amount according to the first embodiment and processing amount in a technique for correcting image shift in increments of pixels.

Note that the correction amount determining unit 103 calculates image shift amount in the vertical direction by shifting each region within the divided reference image 40 in the upward and downward directions by a predetermined range, but this can be set according to camera attachment precision how much the predetermined range thereof is set to. For example, in the event that camera attachment precision is low, the predetermined range can be set to a wide range, and in the event that the precision is high, can be set to a narrow range, and is not restricted to five pixels illustrated in the present embodiment. Also, with the present embodiment, calculation of image shift amount is performed in the upward direction and downward direction, but in the event that it has already been found that image shift has occurred in one of the directions, calculation of image shift amount may be performed as to only one of a range in the upward direction or a range in the downward direction.

Also, with the present embodiment, in the event that at the time of the first correction amount determination, each region has had the same correction direction, correction has been performed for the minimum value equivalent to the correction amount of each region, but in addition to this, based on the last correction amount for each region, a correlation value may be calculated from the correction position thereof to obtain image shift amount. For example, an arrangement may be made wherein, in the event that correction amount is +2 at a certain region, this value is stored in a storage device, and at the time of the next correction amount determination, calculation of summation of the least SAD values may be started from the position of the correct amount thereof. Thereafter, at the time of summation of the least SAD values thereof reaching equal to or smaller than a fixed value (e.g., a predetermined specified value, or a threshold according to the number of horizontal pixels and block size), calculation of image shift amount may be stopped. In this case, in the event that correlation has been checked regarding around the last correction amount, and sufficient correction has been obtained, search for checking correlation as to lines other than that does not have to be performed, the processing amount can be reduced, and correction amount can rapidly be determined.

The image dividing unit 101 does not have to divide the base image and reference image evenly in four directions. In the even of image shift due to distortion of the lens, image shift amount increases in a region near the edges of the base image and reference image, and accordingly, the number of divisions in the region thereof may be increased, and the number of divisions near the center may be decreased. The number of divisions is changed according to positions within the image, and accordingly, image shift can be finely corrected according to positions within the image, and precision of corresponding point search can be improved.

Also, with the present embodiment, disparity data has been calculated with the image of the first camera which is a camera closer to the left side as to a subject as a base image, that is, with the first camera as basis. However, the calculation method is not restricted to this, though the direction of the search range is changed from relationship of disparity, disparity data may be calculated with the image of the second camera which is a camera closer to the right side as to a subject as a base image, that is, with the second camera as a basis.

Also, with the present embodiment, image shift amount between the base image and reference image has been calculated by determining a position where summation of SAD values in one line within the image becomes the minimum, but image shift amount may be calculated using a technique other than this. For example, in the event that there are multiple SAD values approximating to the least SAD value at the time of block matching, reliability of the calculated disparity is regarded as low, the disparity thereof is taken as an error, and error processing is performed. According to this error processing being performed, correction amount may be determined by extracting only disparity having high reliability so that the number of the extracted disparities having high reliability becomes the greatest. Also, another technique such as SSD or the like may be employed regardless of SAD.

Also, an arrangement may be made wherein extraction of a feature point, for example, such as edge extraction or the like is performed, and correction amount is determined in accordance with the correspondence degree of the extracted feature point. For example, edge detection processing is performed on the base image and reference image to create edge images of the base image and reference image. Next, each edge image is divided into regions, and the correspondence degree of an edge is obtained for each region. Disparity exists in the horizontal directions of the base image and reference image, and accordingly, even when the edge images of the base image and reference image are superimposed for each region without change, the positions of the edge positions of both images do not agree. Therefore, each time the divided reference image is moved one pixel in the vertical direction for each region, the divided reference image is moved in the horizontal direction for a predetermined search range. Next, the divided base image and divided reference image are superimposed while moving the divided reference image, and the number of positions where edges agree is calculated. This processing is repeated to obtain the number of positions where edges agree, and to take this number as a correspondence degree in the vertical directions of the base image and reference image. That is to say, the more the number of positions where edges agree increases, the correspondence degree is determined to be great. A position in the vertical direction where this correspondence degree becomes the greatest is determined, thereby calculating image shift amount in the vertical direction to determine correction amount. An image is corrected based on the correction amount thereof, whereby accurate disparity can be calculated.

Second Embodiment

Hereinafter, a second embodiment will be described in detail with reference to the drawings.

Figure 10:
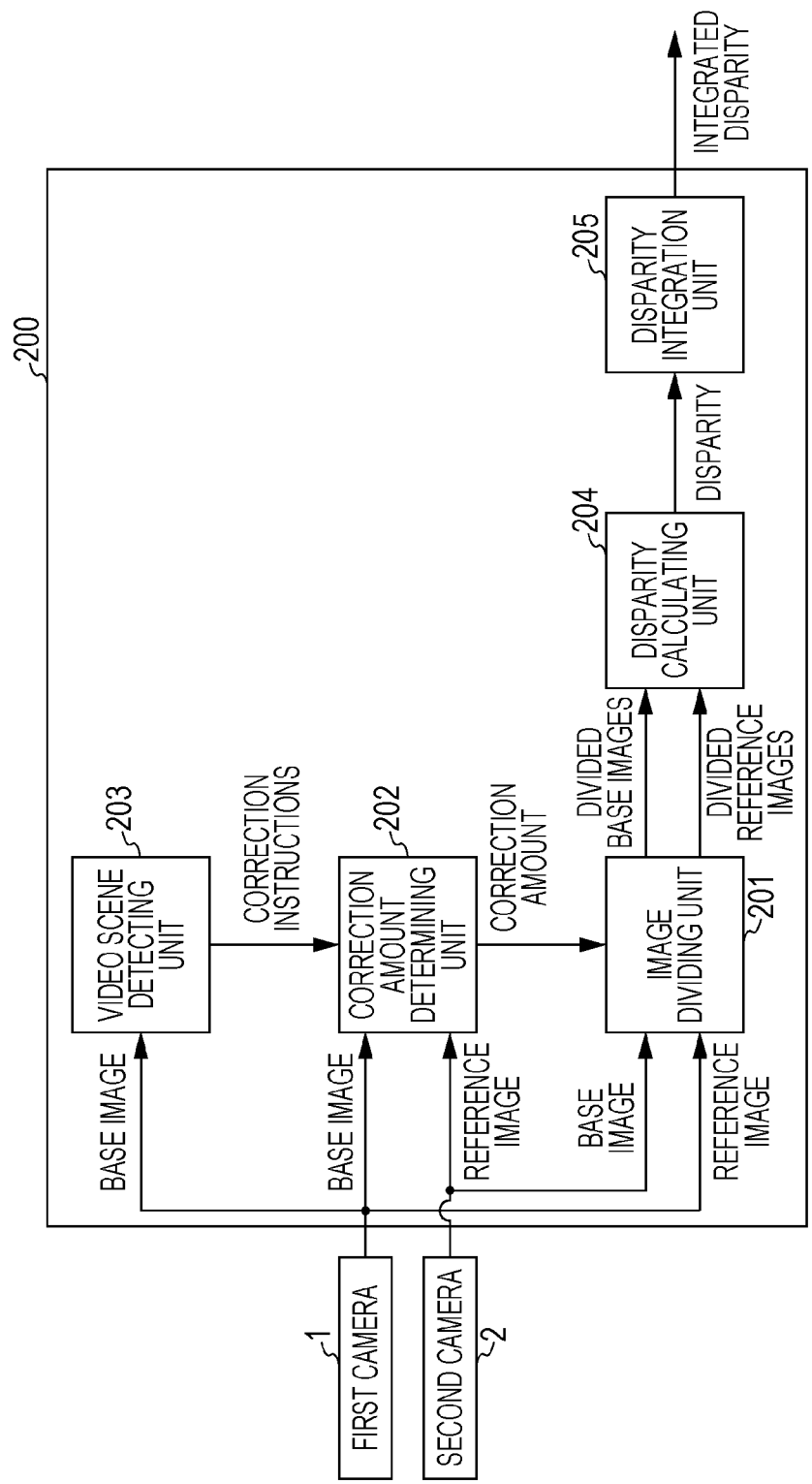
FIG. 10 is a block diagram illustrating a configuration example of a disparity calculating device according to a second embodiment.

FIG. 10 is a block diagram illustrating a configuration example a disparity calculating device 200 according to the second embodiment.

The first camera 1 and second camera 2 shoot the same subject at the same timing, and provide a base image and a reference image which are a shot pair of left and right to a disparity calculating device 200. The disparity calculating device 200 inputs the base image and reference image shot by the first camera 1 and second camera 2, and executes corresponding point search processing and disparity calculation processing using the base image and reference image.

The disparity calculating device 200 includes an image dividing unit 201, a correction amount determining unit 202, a video scene detecting unit 203, a disparity calculating unit 204, and a disparity integration unit 205.

Each of the image dividing unit 201 and correction amount determining unit 202 receives the base image and reference image from the first camera 1 and second camera 2. The base image and reference image are moving images.

The video scene detecting unit 203 receives the base image from the first camera 1, performs video scene analysis on the base image, and detects switching of a video scene. Switching of a video scene is detected by luminance or color information, or temporary halt or operation restart or the like being performed in operation of the first camera 1. In the event of having detected switching of a video scene, the video scene detecting unit 203 provides correction instructions to the correction amount determining unit 202. The video scene detecting unit 203 has a function serving as a correction instructing unit configured to provide correction instructions to the correction amount determining unit 202.

In the event that the positions of the first camera 1 and second camera 2 are shifted in the vertical direction, image shift occurs in the vertical direction according to distance between the cameras and a subject (depth distance). The shorter the distance is between the first camera 1 and second camera 2, and a subject, the greater the image shift amount is in the vertical direction between the base image and reference image, and the longer the distance thereof is, the smaller the image shift amount is in the vertical direction between the base image and reference image. That is to say, at the time of switching of a video scene such that distance between the first camera 1 and second camera 2, and a subject is greatly changed, image shift amount in the vertical direction between the base image and reference image is greatly changed. Therefore, image shift amount before and after switching of a video scene greatly differs. Accordingly, the correction amount determining unit 202 calculates image shift amount in the vertical direction between the base image and reference image after the video scene is switched, determines correction amount corresponding to the image shift amount thereof, and provides to the image dividing unit 201. The image dividing unit 201 divides the based image and reference image based on the correction amount received from the correction amount determining unit 202, and provides a divided base image and divided reference image to the disparity calculating unit 204. The disparity calculating unit 204 performs corresponding point search processing and disparity calculation processing using the divided base image and divided reference image.

With the first embodiment, after the image dividing unit 101 divides the base image and reference image into predetermined regions, the correction amount determining unit 103 determines correction amount for each region. On the other hand, with the second embodiment, the correction amount determining unit 202 calculates image shift amount for each region to be divided by the image dividing unit 201, determines correction amount corresponding to the image shift amount thereof, and provides to the image dividing unit 201. The image dividing unit 201 receives the correction amount from the correction amount determining unit 202, divides the base image and reference image based on the correction amount thereof, and provides the divided base image and divided reference image to the disparity calculating unit 204. The configurations and operations of the disparity calculating unit 204 and disparity integration unit 205 are the same as those illustrated in the first embodiment, and accordingly, description will be omitted.

Figure 11A:
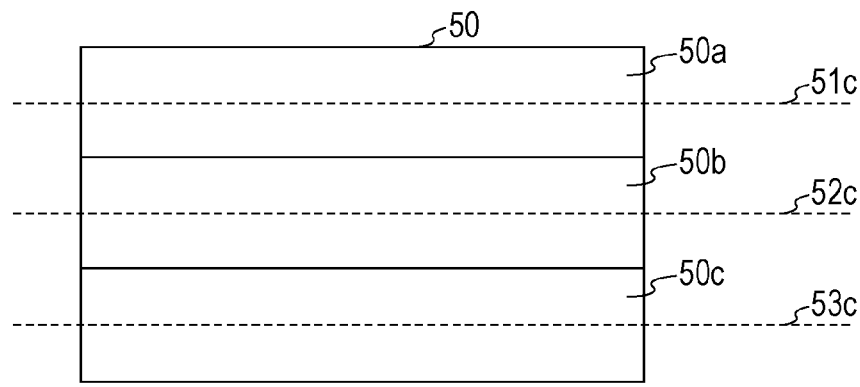
FIG. 11A is an explanatory diagram schematically illustrating a base image and a reference image.
Figure 11B:
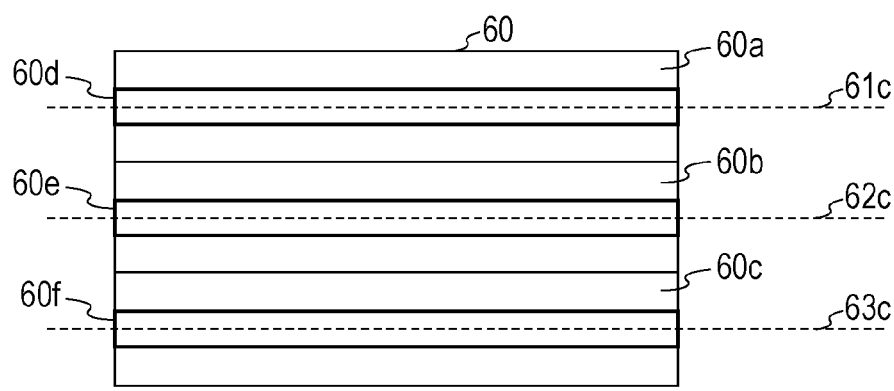
FIG. 11B is an explanatory diagram schematically illustrating a base image and a reference image.

FIG. 11A and FIG. 11B are explanatory diagrams schematically illustrating a base image and a reference image.

FIG. 11A illustrates three regions 50a, 50b, and 50c included in a base image 50, and center lines 51c to 53c of each region, and FIG. 11B illustrates three regions 60a, 60b, and 60c included in a reference image 60, and center lines 61c to 63c of each region. These three regions are regions to be obtained by being divided by the image dividing unit 201 later. In FIG. 11B, the regions 60a to 60c include the center lines 61c to 63c, and three regions 60d, 60e, and 60f made up of upper and lower two lines thereof.

The correction amount determining unit 202 sets the base image window above the center lines 51c, 52c, and 53c, sets the reference image window above the regions 60d, 60e, and 60f, and performs block matching to calculate image shift amount.

Figure 12A:
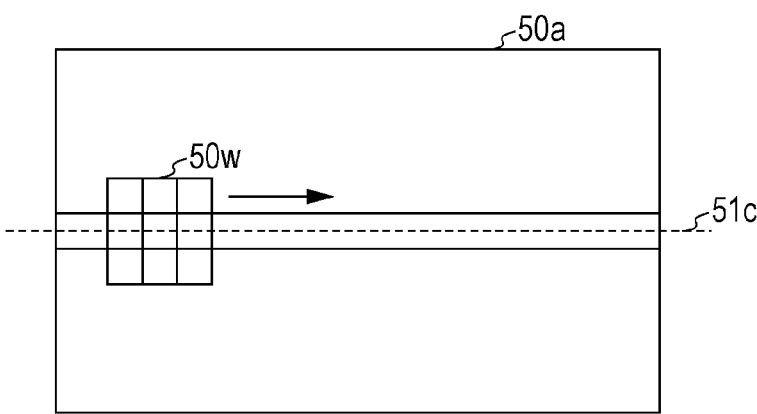
FIG. 12A is an explanatory diagram schematically illustrating block matching.
Figure 12B:
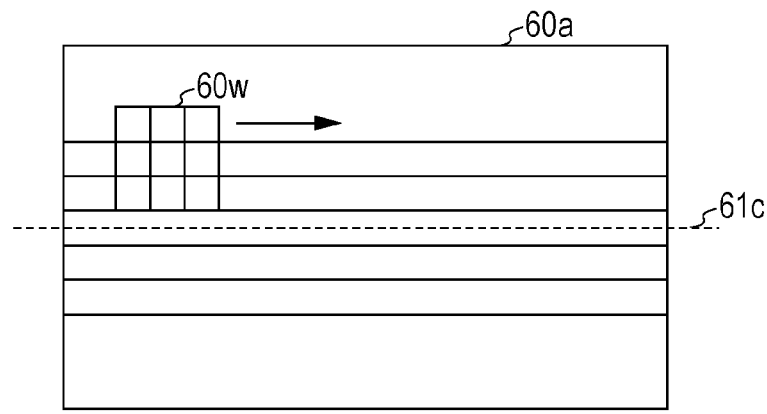
FIG. 12B is an explanatory diagram schematically illustrating block matching.

FIG. 12A and FIG. 12B are explanatory diagrams schematically illustrating block matching.

The correction amount determining unit 202 sets a base image window 50w corresponding to a pixel block of 3×3 pixels with the center line 51c of the region 50a within the base image 50 as the center, sets a reference image window 60w within three lines including the center line 61c of the region 60a within the reference image 60, and upper and lower two lines thereof, performs block matching between the pixel blocks to be extracted by the base image window 50w and reference image window 60w respectively to calculate an SAD value.

The correction amount determining unit 202 sets the base image window 50w as to the center line 51c of the region 50a, and sets the reference image window 60w so that the center of the reference image window 60w is positioned in the second line above the center line 61c of the region 60a.

The correction amount determining unit 202 performs block matching while moving the base image window 50w and reference image window 60w in the right direction to calculate the least SAD value. In the event that the number of pixels in the horizontal direction of the base image 50 and reference image 60 is 120 pixels, and also the number of divisions in the horizontal direction by the image dividing unit 201 is three, the correction amount determining unit 202 calculates summation of the least SAD values in a search range for every 40-pixel length from the left. The correction amount determining unit 202 performs similar processing on the center lines 52c and 53c and regions 60e and 60f to calculate summation of the least SAD values. Next, the correction amount determining unit 202 determines a line when summation of the least SAD values becomes the minimum for each 40-pixel width region, and calculates image shift amount in the vertical direction between the base image 50 and reference image 60 for each 40-pixel width region.

The correction amount determining unit 202 calculates image shift amount for every nine regions to be divided at the image dividing unit 204, and determines correction amount for each region corresponding to image shift amount of these.

The correction amount determining unit 202 stores the determined correction amount for each region in a built-in storage unit (not illustrated). The correction amount determining unit 202 performs the above-mentioned processing each time of receiving a correction instruction from the video scene detecting unit 203, determines correction amount for each region, and updates correction amount for each region stored in the storage unit.

The image dividing unit 201 reads out correction amount for each region from the storage unit of the correction amount determining unit 202, and divides the reference image according to the correction amount for each region thereof. Specifically, the image dividing unit 201 reads out the image for each region of the reference image from a storage region determined by the correction amount for each region at the time of reading out the base image and reference image from built-in image memory (not illustrated).

Figure 13A:
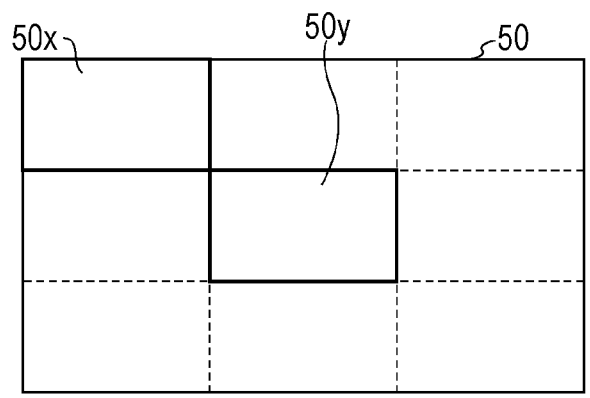
FIG. 13A is an explanatory diagram illustrating a base image and a reference image.
Figure 13B:
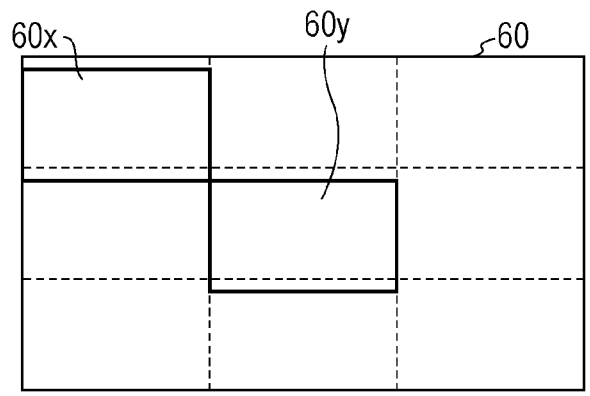
FIG. 13B is an explanatory diagram illustrating a base image and a reference image.

FIG. 13A and FIG. 13B are explanatory diagrams illustrating a base image and a reference image.

FIG. 13A illustrates the base image 50, and FIG. 13B illustrates the reference image 60.

The image dividing unit 201 reads out an image divided into nine regions for example of each of the base image 50 and reference image 60 from the image memory. In the event that the correction amount determining unit 202 has determined correction amount of a region 60x of the reference image 60 corresponding to a region 50x within the based image 50 to be −2 pixels for example, the image dividing unit 201 reads out, based on the correction amount thereof, an image included in a region corresponding to the region 60x from the storage region where the reference image 60 is stored, and provides to the disparity calculating unit 204.

In the event that the correction amount determining unit 202 has determined correction amount of a region 60y of the reference image 60 corresponding to a region 50y within the based image 50 to be −2 pixels for example, the image dividing unit 201 reads out, based on the correction amount thereof, an image included in a region corresponding to the region 60y from the storage region where the reference image 60 is stored, and provides to the disparity calculating unit 204. In this manner, the image dividing unit 201 shifts an image readout position according to the correction amount determined by the correction amount determining unit 202 at the time of reading out the reference image 60 from the image memory.

Figure 14A:
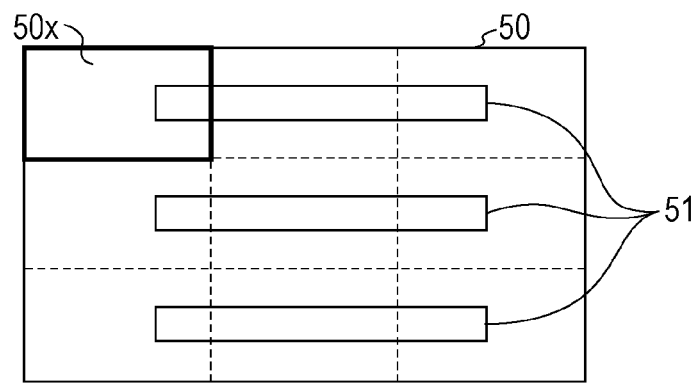
FIG. 14A is an explanatory diagram illustrating a base image and a reference image.
Figure 14B:
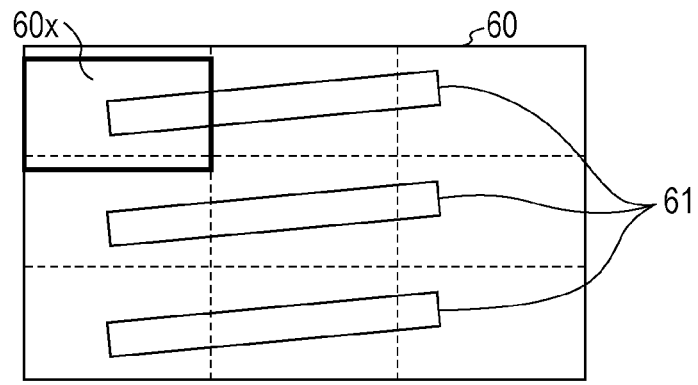
FIG. 14B is an explanatory diagram illustrating a base image and a reference image.

FIG. 14A and FIG. 14B are explanatory diagrams illustrating a base image and a reference image.

FIG. 14A illustrates the reference image 50, and FIG. 14B illustrates the reference image 60.

The same subject images 51 and 61 are included in the base image 50 and reference image 60 respectively. The subject images 51 and 61 exist in a different position according to viewpoint positions or postures of the cameras. Now, let us say that the second camera 2 is inclined as to the first camera 1. As described above, the image dividing unit 201 reads out an image included in the region 60x within the reference image 60 from the image memory as to the region 50x within the base image 50.

Figure 15A:
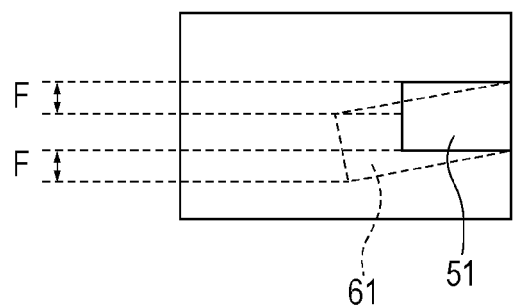
FIG. 15A is an explanatory diagram schematically illustrating image shift in the vertical direction of a subject image in one regions of a base image and a reference image.
Figure 15B:
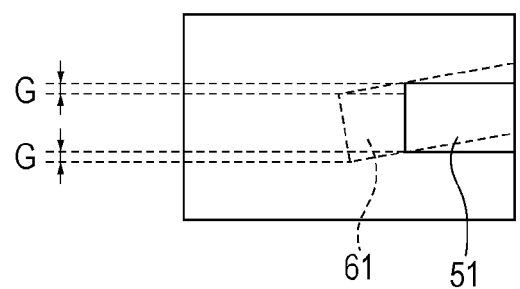
FIG. 15B is an explanatory diagram schematically illustrating image shift in the vertical direction of a subject image in one regions of a base image and a reference image.

FIG. 15A and FIG. 15B are explanatory diagrams schematically illustrating image shift in the vertical direction of a subject image in one regions of a base image and a reference image.

FIG. 15A schematically illustrates a state in which an image included in the region 50x of the base region 50, and an image included in a region of the reference image 60 corresponding to the region 50x are superimposed. FIG. 15B schematically illustrates a state in which an image included in the region 50x of the base image 50, and an image included in the region 60x are superimposed. In other words, FIG. 15A illustrates the base image 50 and the reference image 60 before correction, and FIG. 15B illustrates the base image 50 and the reference image 60 after correction.

In the event of comparing image shift amount in the vertical direction of left-side corner portions of the subject image 51 included in the base image 50, and the subject image 61 included in the reference image 60, image shift amount illustrated in FIG. 15A is F, and image shift amount illustrated in FIG. 15B is G. Here, F>G holds, and accordingly, image shift in the vertical direction between the base image and reference image is decreased by correcting the reference image 60. Thus, the range of corresponding point search is narrowed, and accordingly, processing time spent for corresponding point search can be reduced.

With the first embodiment, after dividing an image, correction amount is obtained for each divided image, and the divided reference image is moved, and accordingly, there may be a region where there is no corresponding point. For example, with the example illustrated in FIG. 8B, as a result of moving the divided reference image in the upward direction, a phenomenon occurs wherein there is no divided reference image corresponding to the lowermost portion of the divided base image, and similarly, there is no divided base image corresponding to the uppermost portion of the divided reference image. On the other hand, with the second embodiment, an image is divided after obtaining correction amount, and accordingly, occurrence of such a phenomenon can be suppressed by changing a readout position according to the correction amount at a divided region in an intermediate portion.

Note that, with the second embodiment, a function serving as a correction instructing unit is provided to the video scene detecting unit 203, but a function serving as a correction instructing unit may be provided to an acceleration detecting unit configured to detect impact as to a camera itself, or change in a camera position. Specifically, an arrangement may be made wherein, in the event that the acceleration detecting unit provided to the camera has detected acceleration equal to or greater than a predetermined threshold, the acceleration detecting unit provides a correction instruction to the correction amount determining unit 202. Thus, change in a shooting scene can be determined from movement of a camera, and also correction can be performed when the positional relationship of the cameras is lost and placement has been changed due to having been subjected to a large impact.

The acceleration detecting unit having a function serving as a correction instructing unit does not have to be provided to a camera itself, and may be provided to a personal digital assistant on which a camera is mounted. Thus, in the event that strong impact or the like has been applied to the personal digital assistant, and position shift of the camera has occurred, the personal digital assistant can calculate correction amount according to movement detected by the acceleration detecting unit, and correct the position shift of the camera.

The correction instructing unit may transmit a correction instruction in increments of predetermined multiple frames or in increments of multiple frames set according to need by a user for example instead of transmitting a correction instruction for each frame to the correction determining unit 202, in the event that the image is moving image data. In this manner, the correction amount determining unit 202 can reduce processing amount by transmitting a correction instruction in increments of multiple frames as compared to a case of performing correction for each frame. Further, consumption power of the personal digital assistant can be saved by reducing processing amount of the correction amount determining unit 202. Also, the correction instructing unit may transmit a correction instruction only at the time of activation by determining activation of the camera. In this manner, performing calculation of correction amount at the time of activation before shooting enables disparity to be routinely calculated with high precision.

The correction instructing unit may simply receive an instruction from the user to provide a correction instruction to the correction determining unit 202.

With the present embodiment, for simplification of description, as illustrated in FIG. 13, at the time of performing region division, an arrangement is made wherein one region of the base image (image obtained from the first camera closer to the left side as to a subject), and the corresponding one region of the reference image (image obtained from the second camera closer to the right side as to the subject) are divided in a position of equal distance from the lateral edge of each image. However, in reality, a corresponding point in the base image exists in a position on the more left side above the reference image. Therefore, it is desirable that a region trimmed from the reference image at the time of disparity calculation is set to a position where the division position of the reference image is shifted to the left side by an amount equivalent to the maximum disparity by taking the maximum disparity of the subject into consideration. In the event that the region is not set in this manner, with regard to near the left edge within the region within the base image, a situation occurs wherein no corresponding point is included in the region trimmed from the reference image, and correct disparity cannot be calculated. The region of the reference image corresponding to a region of reference base image is shifted to the left side and divided in this manner, and accordingly, a region where disparity cannot be calculated can be reduced. Also, in the case of SAD, an accurate SAD value can be calculated by greatly setting both sides of the regions to be divided by an amount equivalent to the window size, and trimming the regions so that parts of the regions to be divided are overlapped.

Also, in the event that there is image shift in the lengthwise direction, disparity exists in the lengthwise direction according to subject distance. That is to say, the shorter subject distance, the greater upward and downward image shift amount increases, and the longer subject distance, the smaller upward and downward image shift amount decreases. Therefore, it is effective to determine correction amount at the time of switching of a video scene such that subject distance is greatly changed. Note that there is influence of rotation or distortion other than influence of image shift in the lengthwise direction, and accordingly, magnitude of image shift amount is not necessarily determined according to subject distance as described above, but it is true that image shift amount is changed for each video scene switching. Accordingly, it is effective to calculate image shift amount for each video scene switching, and to determine correction amount.

Third Embodiment

Hereinafter, a third embodiment will be described in detail with reference to the drawings.

FIG. 16 is a block diagram illustrating a configuration example of a disparity calculating device 300 according to the third embodiment.

A first camera 1 and a second camera 2 shoot the same subject at the same timing, and provide a base image and a reference image which are a shot pair of left and right to a disparity calculating device 300. The disparity calculating device 300 inputs the base image and reference image shot by the first camera 1 and second camera 2, and executes corresponding point search processing and disparity calculation processing using the base image and reference image.

The disparity calculating device 300 includes an image dividing unit 301, a correction amount determining unit 302, a video scene detecting unit 303, an image reduction unit 304, a disparity calculating unit 305, and a disparity integration unit 306.

The configurations and operations of the image dividing unit 301, video scene detecting unit 303, and disparity calculating unit 305 are the same as those illustrated in the second embodiment, and accordingly, description will be omitted.

Hereinafter, the configurations and operations of the correction amount determining unit 302, image reduction unit 304, and disparity integration unit 306 will be described.

Figure 17A:
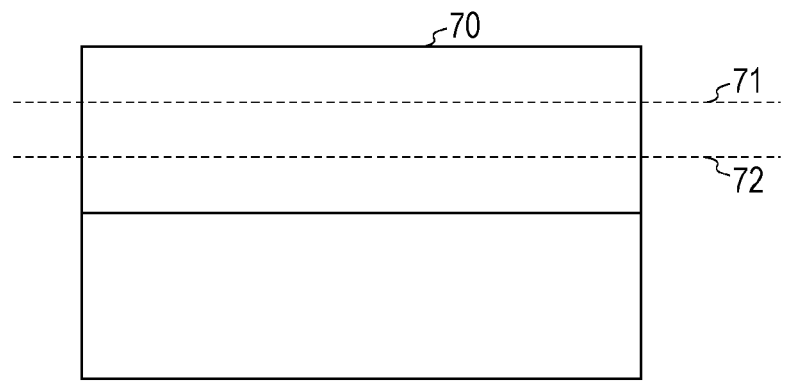
FIG. 17A is an explanatory diagram schematically illustrating a base image and a reference image.
Figure 17B:
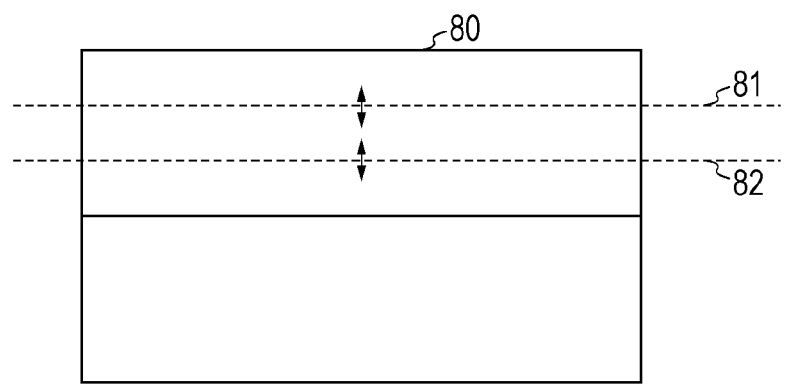
FIG. 17B is an explanatory diagram schematically illustrating a base image and a reference image.

FIG. 17A and FIG. 17B are diagrams schematically illustrating a base image and a reference image.

FIG. 17A illustrates a state in which a base image 70 is divided into two regions upward and downward, and FIG. 17B illustrates a state in which a reference image 80 is divided into two regions upward and downward. Hereinafter, calculation processing of correction amount as to upper half regions of the base image 70 and reference image 80 will be described. Calculation processing of correction amount as to lower half regions of the base image 70 and reference image 80 is the same as the processing as to the upper half regions, and accordingly, description will be omitted.

The correction amount determining unit 302 performs block matching between above horizontal lines 71 and 72 within the base image 70 and above horizontal lines 81 and 82 within the reference image 80, calculates image shift amount in the vertical direction, and determines correction amount as to the reference image 80. Specifically, as described in the second embodiment, the correction amount determining unit 302 sets a base image window configured to extract a pixel block of 3×3 pixels above the horizontal line 71 within the base image 70, and sets a reference image window configured to extract a pixel block of 3×3 pixels above the horizontal line 81 within the reference image 80.

The correction amount determining unit 302 moves, in the same way as with the second embodiment, the base image window in the horizontal direction, and also performs block matching while moving the reference image window in the horizontal direction and in the vertical direction, determines a case where the summation of the least SAD values becomes the smallest, obtains image shift amount in the case thereof, and determines correction amount.

With the third embodiment, in the event that the correction amount of the reference image 80 determined as to the horizontal line 71 within the base image 70 differs from the correction amount of the reference image 80 determined as to the horizontal line 72, the correction amount determining unit 302 provides a mean value of both correction amounts to the image dividing unit 301.

The image dividing unit 301 divides, in the same way as with the second embodiment, the base image 70 and reference image 80 based on the correction amount received from the correction amount determining unit 302, and provides a divided base image and divided reference image to the image reduction unit 304.

The image reduction unit 304 performs reduction processing on the divided base image and divided reference image. For example, the image reduction unit 304 divides length in every direction of each of the divided base image and divided reference image into half, and sets the image size thereof to ¼ of the image size thereof before reduction. That is to say, the image reduction unit 304 sets the resolution of the divided base image and divided reference image to ¼ of the resolution before reduction. The number of pixels in the horizontal direction of the divided base image and divided reference image is halved, and accordingly, disparity to be calculated by the disparity calculating unit 305 also is halved as compared to a case where the divided base image and divided reference image are not reduced. On the other hand, the number of pixels in the vertical direction of the divided base image and divided reference image also is halved, and accordingly, the image shift amount in the vertical direction between the divided base image and divided reference image also is halved. That is to say, as illustrated in FIG. 15B, in the event that image shift amount after correcting the reference image is G, the image shift amount further is halved by performing reduction processing, that is, G/2.

Disparity has been halved by means of the image reduction unit 304, and accordingly, the disparity integration unit 306 subjects the disparity received from the disparity calculating unit 305 to enlargement processing to double the disparity thereof. Examples of the enlargement processing include bilinear interpolation and nearest neighbor interpolation.

With the third embodiment, image shift amount is reduced by reducing the image sizes of the divided base image and divided reference image. As a result thereof, the image shift amount is reduced, and accordingly, a possibility that disparity will be able to be calculated increases, and also the search range of corresponding point search is narrowed, and processing time used for the corresponding point search can be reduced.

Note that, with the above example, though the image sizes of the divided base image and divided reference image have been reduced, the base image and reference image may be divided after being reduced. In the event that the base image and reference image are reduced with a predetermined reduction rate, image shift amount is also reduced according to the reduction rate along with reduction of both images. Accordingly, image shift amount can be calculated by performing block matching with a range where the upward and downward directions of the images are shorter. Calculating image shift amount by performing block matching in a range shorter in the upward and downward directions on the images after reduction is the same as calculating image shift amount in a range wider in the upward and downward directions on the images before reduction, thereby facilitating calculation of image shift amount in the event that both images are greatly shifted. Also, with the above example, though correction amount has been determined using the two horizontal lines within the base image and reference image, correction amount may be determined using many more horizontal lines. For example, in the event of determining correction amount using three horizontal lines, a median value of correction amount to be calculated for each line may be determined to be correction amount.

Fourth Embodiment

Hereinafter, a fourth embodiment will be described in detail with reference to the drawings.

Figure 18:
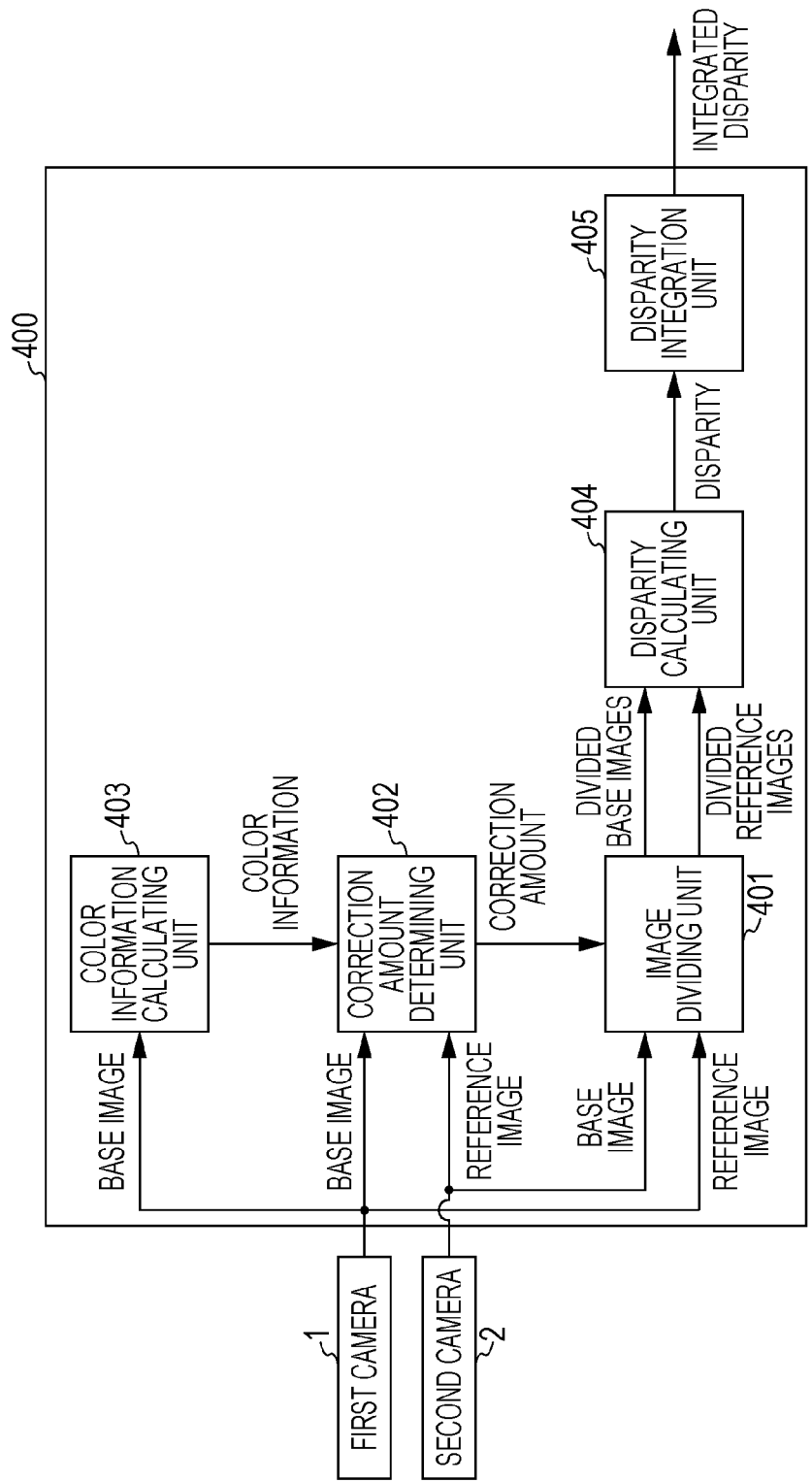
FIG. 18 is a block diagram illustrating a configuration example of a disparity calculating device according to a fourth embodiment.

FIG. 18 is a block diagram illustrating a configuration example of a disparity calculating device 400 according to the fourth embodiment.

A first camera 1 and a second camera 2 shoot the same subject at the same timing, and provide a base image and a reference image which are a shot pair of left and right to a disparity calculating device 400. The disparity calculating device 400 inputs the base image and reference image shot by the first camera 1 and second camera 2, and executes corresponding point search processing and disparity calculation processing using the base image and reference image.

The disparity calculating device 400 includes an image dividing unit 401, a correction amount determining unit 402, a color information calculating unit 403, a disparity calculating unit 404, and a disparity integration unit 405.

The configurations and operations of the image dividing unit 401, disparity calculating unit 404, and disparity integration unit 405 are the same as those illustrated in the second embodiment, and accordingly, description will be omitted.

Hereinafter, the configurations and operations of the correction amount determining unit 402 and color information calculating unit 403 will be described.

The color information calculating unit 403 inputs the base image, and the image dividing unit 401 analyzes the image to calculate color information for each region estimated to be divided by the image dividing unit 401. For example, the color information calculating unit 403 calculates an average of pixel values of RGB pixels of an RGB image included in each region (hereinafter, referred to as "mean value of RGB"), and outputs the mean value of RGB as color information. It can be determined from this color information what kind of hue many subjects have within each region. For example, with a region where the sky occupies the majority as a subject, the value of B of the mean value of RGB increases, and accordingly, it is found that the majority of the colors of the image of the region thereof is blue. The color information calculating unit 403 provides the color information to the correction amount determining unit 402.

The correction amount determining unit 402 performs block matching for calculating image shift amount, and determines color to be used for block matching for each region using the color information at that time. For example, in the event that the value of B of the mean value of RGB is high as described above, it is found that this region is a region including many blue subjects, and in the event that correlation values have been calculated using B, any has a similar color, and any of the correlation values is high, and accordingly, accurate image shift amount may be prevented from being calculated. Therefore, a degree of correlation is calculated using R or G, whereby accurate image shift amount can be calculated.

Note that, regarding what color is used for calculating image shift amount according to the color information, color to be used for block matching can be determined by storing a color information reference table in internal memory (not illustrated) beforehand, and referencing the reference table thereof. Alternatively, block matching may be performed by comparing the mean values of RGB and using a color having the least mean value.

In this manner, a color to be used for block matching is selected according to the color information, whereby correction amount can be determined by calculating image shift amount more accurately.

Also, with the above example, though the color information has been determined to be a mean value of RGB for each region, the determining method is not restricted to this, and an arrangement may be made wherein each region is further divided into multiple small regions based on the color information, and the mean value of RGB of a region having the greatest area out of these multiple regions is determined to be color information. Also, in the event that each region is further divided into multiple small regions, and with the pixel values of RGB values of each small region, for example, R is equal to or greater than 200, and G and B are equal to or smaller than 50, the color of the small region thereof is determined to be red, and in the event that the number of red small regions is equal to or greater than a predetermined number, the color of the region may be handled as red.

With the first to fourth embodiments, though a disparity calculating device using two cameras has been described as an example, three or more cameras may be used. Specifically, an arrangement may be made wherein a camera serving as a base is determined, a base image is obtained from the camera thereof, and a reference image is obtained from the other cameras.

According to the first to fourth embodiments, disparity data indicating image shift amount in the horizontal direction can accurately be calculated, but a configuration for calculating distance data based on the disparity data thereof may further be added. Specifically, in the event that there have been found camera parameters such as base length which is an interval between the cameras, inclinations and resolutions of the cameras, and so forth, there may be configured a distance calculating device which calculates, after calculating disparity data, distance data (depth data) from the disparity data using a known calculating method.

With the first to fourth embodiments, though there has been illustrated an example wherein two cameras are disposed by the parallel method, two cameras may be disposed so that the optical axes of the two cameras have convergence. In the event that the cameras have been disposed so that the optical axes of the two cameras have convergence, unlike a case where the cameras are disposed using the parallel method, a corresponding point corresponding to the point of interest above the base image does not necessarily exist on the left side above the reference image. Accordingly, in such a case, corresponding point search is performed as to both left and right directions above the reference image. Also, in the event that the optical axes of the two cameras have convergence, a shot image has distortion from the beginning, the point of interest and a corresponding point do not exist above the same straight line, and accordingly, accurate disparity cannot be calculated as it is. However, according to the first to fourth embodiments, the processing is performed wherein the base image and reference image are divided, position adjustment in the upward and downward directions is performed, and corresponding point search as to both left and right directions is performed above the reference image, and accordingly, accurate disparity can be calculated.

The first to fourth embodiments can be applied to a camera system including two camera modules, or a mobile terminal, display device, vehicle camera system, or distance detecting device, which include the camera system thereof, or the like.

Also, a shot image at a camera may be processed by being input to a computer such as a personal computer or the like, wherein disparity or distance may be calculated by storing the image in a storage device and using the image thereof.

Fifth Embodiment

Hereinafter, a fifth embodiment will be described in detail with reference to the drawings.

FIG. 19 is a block diagram illustrating a configuration example of a disparity calculating device 500 according to the fifth embodiment.

A first camera 1 and a second camera 2 shoot the same subject at the same timing, and provide a base image and a reference image which are a shot pair of left and right to a disparity calculating device 500. In the same way as with the first embodiment, let us say that the image of the first camera 1 positioned closer to the left as to a subject is taken as a base image, and the image of the second camera 2 positioned closer to the right as to the subject is taken as a reference image. Also, the first camera 1 and second camera 2 are disposed so as to shoot a subject using the parallel method.

The disparity calculating device 500 inputs the base image and reference image shot by the first camera 1 and second camera 2, and executes corresponding point search processing and disparity calculation processing using the input base image and reference image.

The disparity calculating device 500 includes an image dividing unit 501, a condition setting unit 502, a correction amount determining unit 503, a correction amount analyzing unit (difference calculating unit) 504, a disparity calculating unit 505, a disparity integration unit 506, and a storage unit 507.

The configurations and operations of the disparity calculating unit 505 and disparity integration unit 506 are the same as those illustrated in the first embodiment, and accordingly, description will be omitted.

The storage unit 507 is memory configured to store correction amount for each region determined by the correction amount determining unit 202 in the second embodiment. Also, the storage unit 507 is image memory configured to store a divided base image and divided reference image divided by the image dividing unit 501.

The image dividing unit 501 divides the base image and reference image into multiple regions in accordance with the number of divisions set by the condition setting unit 502, and stores the divided base image and divided reference image in a predetermined region in the storage unit 507.

The image dividing unit 501 provides the divided base image and divided reference image to the correction amount determining unit 503 and disparity calculating unit 505. The condition setting unit 502 sets the number of divisions of the images. Examples of the number of divisions include nine (vertically 3×horizontally 3). That is to say, the image dividing unit 501 divides each of the base image and reference image into nine regions.

The correction amount determining unit 503 obtains the divided base image and divided reference image from the image dividing unit 501 or storage unit 507. The correction amount determining unit 503 calculates image shift amount in the vertical direction between the divided base image and divided reference image, and determines correction amount for reducing the calculated image shift, for each region.

The correction amount analyzing unit 504 analyzes correction amount for each region determined by the correction amount determining unit 503. The correction amount analyzing unit 504 informs the condition setting unit 502 so as to change the number of divisions for dividing the images, based on the analyzed correction amount for each region.

In the event of having accepted a notification according to change in the number of divisions from the correction amount analyzing unit 503, the condition setting unit 502 sets the number of divisions of the images again. The image dividing unit 501 divides the base image and reference image into multiple regions again in accordance with the number of divisions set again by the condition setting unit 502. The image dividing unit 501 provides the divided base image and divided reference image divided again to the correction amount determining unit 503 and disparity calculating unit 505.

Hereinafter, the operations of the components of the disparity calculating device 500 will be described in detail.

FIG. 20A and FIG. 20B are explanatory diagrams illustrating a base image and a reference image. FIG. 20A illustrates a reference image 507 which is a left image shot by the first camera 1. FIG. 20B illustrates a reference image 508 which is a right image shot by the second camera 2. Now, let us say that, with a reference image 508, there is barrel distortion due to a lens included in the second camera 2. Therefore, the closer to left and right edges of the reference image 508 an image portion or image region is, the greater shift amount in the vertical direction as to the base image 507 is due to influence of barrel distortion.

With the base image 507 and reference image 508 illustrated in FIG. 20A and FIG. 20B, the image dividing unit 501 divides, as illustrated with a dotted line in FIG. 20A and FIG. 20B, the base image 507 and reference image 508 into nine. The correction amount determining unit 503 calculates correction amount based on the base image 507 and reference image 508 divided into nine by the image dividing unit 501. The correction amount determining unit 503 provides the calculated correction amount data to the correction amount analyzing unit 504.

Figures 21B, 22:
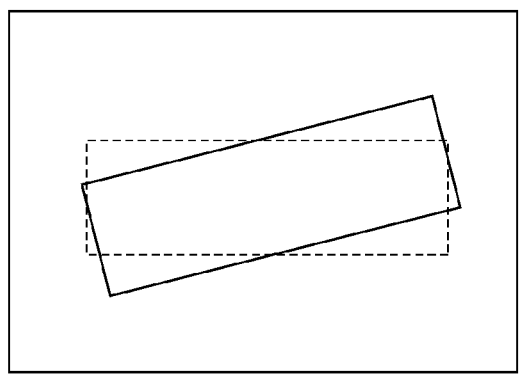
FIG. 21B is an explanatory diagram illustrating correction amount of each region calculated by a correction amount determining unit.
FIG. 22 is an explanatory diagram schematically illustrating a state in which an upper left region and a subject image in each of FIG. 20A and FIG. 20B are superimposed.

FIG. 21A and FIG. 21B are explanatory diagrams illustrating correction amount of each region calculated by the correction amount determining unit 503.

Numeric values in FIG. 21A and FIG. 21B represent correction amount (pixels) calculated by the correction amount determining unit 503. In FIG. 21A and FIG. 21B, + of a sign means that a direction where the reference image 508 is shifted for correction is the upward direction, and − of a sign means that a direction where the reference image 508 is shifted for correction is the downward direction. FIG. 21A illustrates correction amount calculated regarding each region corresponding to the first image division. FIG. 21B illustrates correction amount calculated regarding each region corresponding to the images divided again.

The correction amount analyzing unit 504 receives the correction amount calculated by the correction amount determining unit 503. The correction amount analyzing unit 504 analyzes, based on the received correction amount, difference of correction amount between regions of left and right adjacent images. For example, in the event of focusing on an upper left region in FIG. 21A, correction amount of this upper left region is +3. Also, correction amount in the right-side adjacent region (upper center region) as to the upper left region is 0. The absolute value of difference of correction amount in each region becomes 3. In the event that all of the regions in the image have shift amount corresponding to the same direction, correction amount in each region is generally the same, and accordingly, it is found that the greater the absolute value of difference of correction amount in each region, the greater the image is distorted.

FIG. 22 is an explanatory diagram schematically illustrating a state in which the upper left region and subject image in each of FIG. 20A and FIG. 20B are superimposed.

In the event that distortion in the image is great, even when performing correction so that shift in the upward and downward directions in the upper left region is eliminated around the center of the subject image as illustrated in FIG. 22, shift remains in the left and right of the subject image, and also the direction of remaining shift becomes an inverse direction in the left and right of the subject image.

Therefore, in the event that distortion in the image is great, there can be conceived a technique wherein the images are divided more finely by a greater number than the already divided number. With regions of the further finely divided image, calculation of correction amount is executed again, whereby disparities of the base image 507 and reference image 508 can readily be calculated. This is because the images are finely divided, whereby shift in the upward and downward directions is further reduced in regions after division. A corresponding point is searched with a certain block size by shift being reduced, and accordingly, disparity can readily be calculated.

Now, we will assume that a threshold for the correction amount analyzing unit 504 determining whether to perform redivision of the images is set beforehand, and that this threshold is two, for example. For example, in the event that difference of correction amount between the upper left region and upper center region in FIG. 21A is three greater than the threshold of two, and accordingly, distortion between the upper left region and upper center region is great, the correction amount analyzing unit 504 determines to perform redivision regarding each of the regions. Therefore, the correction amount analyzing unit 504 informs change of the number of divisions to the condition setting unit 502. The condition setting unit 502 increases, based on the notification from the correction amount analyzing unit 504, the number of divisions in a region where difference of correction amount as to an adjacent region is great. The image dividing unit 501 divides the base image 507 and reference image 508 again based on the number of divisions of the regions set again by the condition setting unit 502. The correction amount determining unit 503 then performs, based on the divided base image and divided reference image divided again by the image dividing unit 501, calculation and determination of correction amount more finely.

The condition setting unit 502 sets the number of divisions to double of that at the beginning in the left and right directions again in each region of the image upper portion and image lower portion in FIG. 20A and FIG. 20B. It goes without saying that the number of divisions for redivision in an adjacent region where distortion is great is not restricted to the initial double, and may be greater than double.

The image dividing unit 501 divides, based on the number of divisions of each region set again by the condition setting unit, the base image 507 and reference image 508 again. The correction amount calculating unit 503 performs calculation of correction amount for each region divided again by the image dividing unit 501. An explanatory diagram illustrating results thereof is FIG. 21B. The condition setting unit 502 increases the number of divisions of a region having great distortion, whereby the correction amount determining unit 503 can accurately calculate correction amount. The disparity calculating device 500 reduces shift amount in the upward and downward directions in the reference image 508 after correction as to the base image 507, whereby disparity can readily be calculated.

With the fifth embodiment, it has been assumed that there is barrel distortion in the lens of the camera. However, the disparity calculating device 500 consistently increases the number of divisions in a region having great difference of correction amount, and accordingly, for example, even if there is spool distortion or pincushion distortion in the lens of the camera, disparity can accurately be calculated.

With the fifth embodiment, the threshold for the correction amount analyzing unit 504 determining whether to divide the image again has been set to two. However, this threshold may be changed as appropriate according to parameters such as resolution of an image, a block size at the time of calculating disparity and so forth, whether to reduce an image, and so forth. The disparity calculating device 500 may also include means whereby the user can change the threshold as appropriate according to these parameters. Alternatively, the disparity calculating device 500 may manage the threshold changed by the user as appropriate by storing this in the storage unit 507.

Also, the disparity calculating device 500 may set multiple thresholds, and change the number of divisions according to the set multiple thresholds. With the disparity calculating device 500, the greater difference of correction amount as to an adjacent region is, the more the number of divisions is increased, whereby shift amount can accurately be corrected according to distortion amount, and disparity can readily be calculated.

With a left image and a right image which make up a stereoscopic image, positions on the images where the subject is shot differ. Therefore, the greater distortion an image has, the greater shift amount is upward and downward for each subject position, and accordingly, it is difficult to calculate accurate disparity using normal stereo matching, a technique for searching for a corresponding point by recognizing an object, or the like. However, with the technique according to the fifth embodiment, such a case can be handled.

Also, in the event of increasing the number of divisions from the beginning with software processing, a great amount of time is needed for calculation of correction amount. However, according to the disparity calculating device 500, correction amount can adaptively be calculated according to images, and accordingly contributes to reduction such as processing amount, processing time, and so forth.

Also, there are many cases where a subject at a short distance from a camera is shot in a center portion of an image, in which case the subject will often appear large in the image. In the event the number of divisions set to such an image is too great, regions having few subject features to act as clues for calculating disparity are divided, and consequently, the correction amount may be erroneously calculated. However, according to the disparity calculating device 500, the number of divisions of the images is set again after calculating correction amount, and correction amount is determined again, thereby also providing an advantage to prevent such erroneous operation.

Note that the embodiments disclosed this time are exemplifications, and should be considered as being nonrestrictive. The scope of the present invention does not have the above-mentioned meaning but is set forth by the Claims, which intends that all modifications within the meaning and scope equivalent to the Claims are encompassed in the present invention.

The invention claimed is:

1. A disparity calculating device configured to calculate disparity serving as image shift between images obtained from two viewpoints, comprising:
   image dividing circuitry configured to divide each of the images into multiple regions;
   correction amount determining circuitry configured to calculate an image shift amount between the images in a direction perpendicular to a direction where two viewpoints are connected for each of the regions resulting from division by the image dividing circuitry, and to determine a correction amount corresponding to the image shift amount;
   disparity calculating circuitry configured to correct the images for each of the regions on the basis of the correction amount determined by the correction amount determining circuitry, and to calculate disparity on the basis of the corrected images; and
   correction instructing circuitry configured to instruct the correction amount determining circuitry to determine a correction amount each time the correction instructing circuitry obtains a predetermined number of frames,
   wherein, in a case where directions of image shift for the individual regions are the same, the disparity calculating circuitry is configured to select a minimum value from among image shift amounts calculated for the individual regions, and to correct the images for each region after correcting the entire images in accordance with the minimum value.

2. The disparity calculating device according to claim 1, further comprising:
   storage circuitry configured to store correction amounts of the individual regions,
   wherein the correction amount determining circuitry is configured to determine a correction amount on the basis of the correction amounts in the past stored in the storage circuitry.

3. The disparity calculating device according to claim 1, wherein the image dividing circuitry is configured to divide a region so that the regions resulting from division have different sizes.

4. The disparity calculating device according to claim 3, wherein the image dividing circuitry is configured to divide the images so that regions at center portions of the images are greater than regions at surrounding portions of the images.

5. A distance calculating device comprising:
   the disparity calculating device according to claim 1; and
   distance calculating circuitry configured to calculate, on the basis of disparity calculated by the disparity calculating device, a distance between the viewpoints and a subject.

6. A disparity calculating device configured to calculate disparity serving as image shift between images obtained from two viewpoints, comprising:
   image dividing circuitry configured to divide each of the images into multiple regions;
   correction amount determining circuitry configured to calculate an image shift amount between the images in a direction perpendicular to a direction were two viewpoints are connected for each of the regions resulting from division by the image dividing circuitry, and to determine a correction amount corresponding to the image shift amount;
   disparity calculating circuitry configured to correct the images for each of the regions on the basis of the correction amount determined by the correction amount determining circuitry, and to calculate disparity on the basis of the corrected images; and
   correction instructing circuitry configured to detect switching of a scene, and in case of having detected switching of a scene, to instruct the correction amount determining circuitry to determine a correction amount,
   wherein, in a case where directions of image shift for the individual regions are the same, the disparity calculating circuitry is configured to select a minimum value from among image shift amounts calculated for the individual regions, and to correct the images for each region after correcting the entire images in accordance with the minimum value.

7. A disparity calculating device configured to calculate disparity serving as image shift between images obtained from two viewpoints, comprising:
   image dividing circuitry configured to divide each of the images into multiple regions;
   correction amount determining circuitry configured to calculate an image shift amount between the images in a direction perpendicular to a direction where two viewpoints are connected for each of the regions resulting from division by the image dividing circuitry, and to determine a correction amount corresponding to the image shift amount;
   disparity calculating circuitry configured to correct the images for each of the regions on the basis of the correction amount determined by the correction amount determining circuitry, and to calculate disparity on the basis of the corrected images; and
   correction instructing circuitry configured to detect acceleration, and in case of having detected acceleration equal to or higher than a predetermined threshold, to instruct the correction amount determining circuitry to determine a correction amount,
   wherein, in a case where directions of image shift for the individual regions are the same, the disparity calculating circuitry is configured to select a minimum value from among image shift amounts calculated for the individual regions, and to correct the images for each region after correcting the entire images in accordance with the minimum value.

8. A disparity calculating device configured to calculate disparity serving as image shift between images obtained from two viewpoints, comprising:
   image dividing circuitry configured to divide each of the images into multiple regions;
   correction amount determining circuitry configured to calculate an image shift amount between the images in a direction perpendicular to a direction where two viewpoints are connected for each of the regions resulting from division by the image dividing circuitry, and to determine a correction amount corresponding to the image shift amount;
   disparity calculating circuitry configured to correct the images for each of the regions on the basis of the correction amount determined by the correction amount determining circuitry, and to calculate disparity on the basis of the corrected images;
   correction instructing circuitry configured to instruct the correction amount determining circuitry to determine a correction amount each time the correction instructing circuitry obtains a predetermined number of frames; and difference calculating circuitry configured to calculate a difference in correction amount between adjacent regions on the basis of correction amounts of the individual regions determined by the correction amount determining circuitry, wherein the image dividing circuitry is configured to further divide, in a case where the difference between regions calculated by the difference calculating circuitry is equal to or greater than a predetermined threshold, each of the regions.

9. The disparity calculating device according to claim 8, wherein the image dividing circuitry is configured to determine, in accordance with the difference calculated by the difference calculating circuitry, the number of regions into which each of the adjacent regions is to be divided, and to further divide the regions in accordance with the determined number.

10. A disparity calculating device configured to calculate disparity serving as image shift between images obtained from two viewpoints, comprising:

image dividing circuitry configured to divide each of the images into multiple regions;

correction amount determining circuitry configured to calculate an image shift amount between the images in a direction perpendicular to a direction where two viewpoints are connected for each of the regions resulting from division by the mage dividing circuitry, and to determine a correction amount corresponding to the image shift amount;

disparity calculating circuitry configured to correct the images for each of the regions on the basis of the correction amount determined by the correction amount determining circuitry, and to calculate disparity on the basis of the corrected images;

correction instructing circuitry configured to detect switching of a scene, and in case of having detected switching of a scene, to instruct the correction amount determining circuitry to determine a correction amount; and difference calculating circuitry configured to calculate a difference in correction amount between adjacent regions on the basis of correction amounts of the individual regions determined by the correction amount determining circuitry, wherein the image dividing circuitry is configured to further divide, in a case where the difference between regions calculated by the difference calculating circuitry is equal to or greater than a predetermined threshold, each of the regions.

11. The disparity calculating device according to claim 10, wherein the image dividing circuitry is configured to determine, in accordance with the difference calculated by the difference calculating circuitry, the number of regions into which each of the adjacent regions is to be divided, and to further divide the regions in accordance with the determined number.

12. A disparity calculating device configured to calculate disparity serving as image shift between images obtained from two viewpoints, comprising:

image dividing circuitry configured to divide each of the images into multiple regions;

correction amount determining circuitry configured to calculate an image shift amount between the images in a direction perpendicular to a direction where two viewpoints are connected for each of the regions resulting from division by the image dividing circuitry, and to determine a correction amount corresponding to the image shift amount;

disparity calculating circuitry configured to correct the images for each of the regions on the basis of the correction amount determined by the correction amount determining circuitry, and to calculate disparity on the basis of the corrected images;

correction instructing circuitry configured to detect acceleration, and in case of having detected acceleration equal to or higher than a predetermined threshold, to instruct the correction amount determining circuitry to determine a correction amount; and difference calculating circuitry configured to calculate a difference in correction amount between adjacent regions on the basis of correction amounts of the individual regions determined by the correction amount determining circuitry, wherein the image dividing circuitry is configured to further divide, in a case where the difference between regions calculated by the difference calculating circuitry is equal to or greater than a predetermined threshold, each of the regions.

13. The disparity calculating device according to claim 12, wherein the image dividing circuitry is configured to determine, in accordance with the difference calculated by the difference calculating circuitry, the number of regions into which each of the adjacent regions is to be divided, and to further divide the regions in accordance with the determined number.

\* \* \* \* \*